(12) United States Patent
Micko et al.

(10) Patent No.: US 12,352,601 B1
(45) Date of Patent: Jul. 8, 2025

(54) TECHNIQUES FOR DETERMINING DISTANCES USING PASSIVE INFRARED SENSORS

(71) Applicant: Amazon Technologies, Inc., Seattle, WA (US)

(72) Inventors: Eric S. Micko, San Jose, CA (US); Sonny Windstrup Rasmussen, Singapore (SG)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 561 days.

(21) Appl. No.: 17/855,752

(22) Filed: Jun. 30, 2022

(51) Int. Cl.
    *G01C 3/02*      (2006.01)
    *G01C 3/08*      (2006.01)
    *G01J 3/10*      (2006.01)
    *H04N 7/18*      (2006.01)

(52) U.S. Cl.
    CPC ............... *G01C 3/02* (2013.01); *G01C 3/08* (2013.01); *H04N 7/183* (2013.01); *H04N 7/188* (2013.01); *G01J 3/108* (2013.01)

(58) Field of Classification Search
None
See application file for complete search history.

(56) References Cited

U.S. PATENT DOCUMENTS 10,930,126 B1 * 2/2021 Jeong .................. H04N 23/611
2017/0076588 A1 3/2017 Naylor et al.
2017/0205289 A1 * 7/2017 Purohit ................ G06V 10/147
2017/0328777 A1 * 11/2017 Zeckendorf ............. G01V 8/00
2018/0335342 A1 * 11/2018 Micko .................. G08B 29/185

OTHER PUBLICATIONS

Monaci, Gianluca "Indoor using zoning and tracking in passive infared sensing systems", 20th European Signal-Processing Conference (EUSIPCO 2012), Aug. 27-31, 2012, 6 pages.
Yang, Tianye et al., "A new PIR-based method for real-time tracking", Beihang University, Beijing, China, The University of Texas at Dallas, Dec. 23, 2019, 11 pages.
Zappi, Piero et al., "Tracking Motion Direction and Distance with Pyroelectric IR Sensors", IEEE Sensors Journal, vol. 10 No. 9, Sep. 2010, 9 pages.

* cited by examiner

*Primary Examiner* — Raymond L Nimox
(74) *Attorney, Agent, or Firm* — K&L Gates LLP

(57) ABSTRACT

This disclosure describes, in part, techniques for using multiple passive infrared sensors to determine a distance to an object. For instance, an electronic device may include a first passive infrared sensor including a first FOV that extends a first distance from the electronic device and a second passive infrared sensor including a second FOV that extends a second distance from the electronic device further than the first distance. The electronic device may generate first sensor data using the first passive infrared sensor and second sensor data using the second passive infrared sensor. The electronic device may then determine a first amplitude associated with the first sensor data and a second amplitude associated with the second sensor data and determine a ratio between the amplitudes. After the ratio is determined, the electronic device may determine a distance associated with the ratio, generate image data based on the distance, and send the image data to computing device(s).

29 Claims, 25 Drawing Sheets

TECHNIQUES FOR DETERMINING DISTANCES USING PASSIVE INFRARED SENSORS

BACKGROUND

Security devices, such as video doorbells, using motion sensors to detect visitors. For example, when a visitor approaches an entrance of a home, a video doorbell located proximate to the entrance uses motion sensors to detect the visitor. The video doorbell may then perform one or more processes, such as sending a motion alert indicating that the visitor was detected or generating a video depicting the visitor. However, in some circumstances, a user of the video doorbell may only want to be notified when visitors are within a specific distance from the video doorbell. For example, if the field-of-view (FOV) of the motion sensors includes both the walkway that is located a first distance from the electronic device a sidewalk that is located a second, further distance from the electronic device, the user may only want to be notified when visitors are located on the entrance, but not when other pedestrians are located on the sidewalk.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
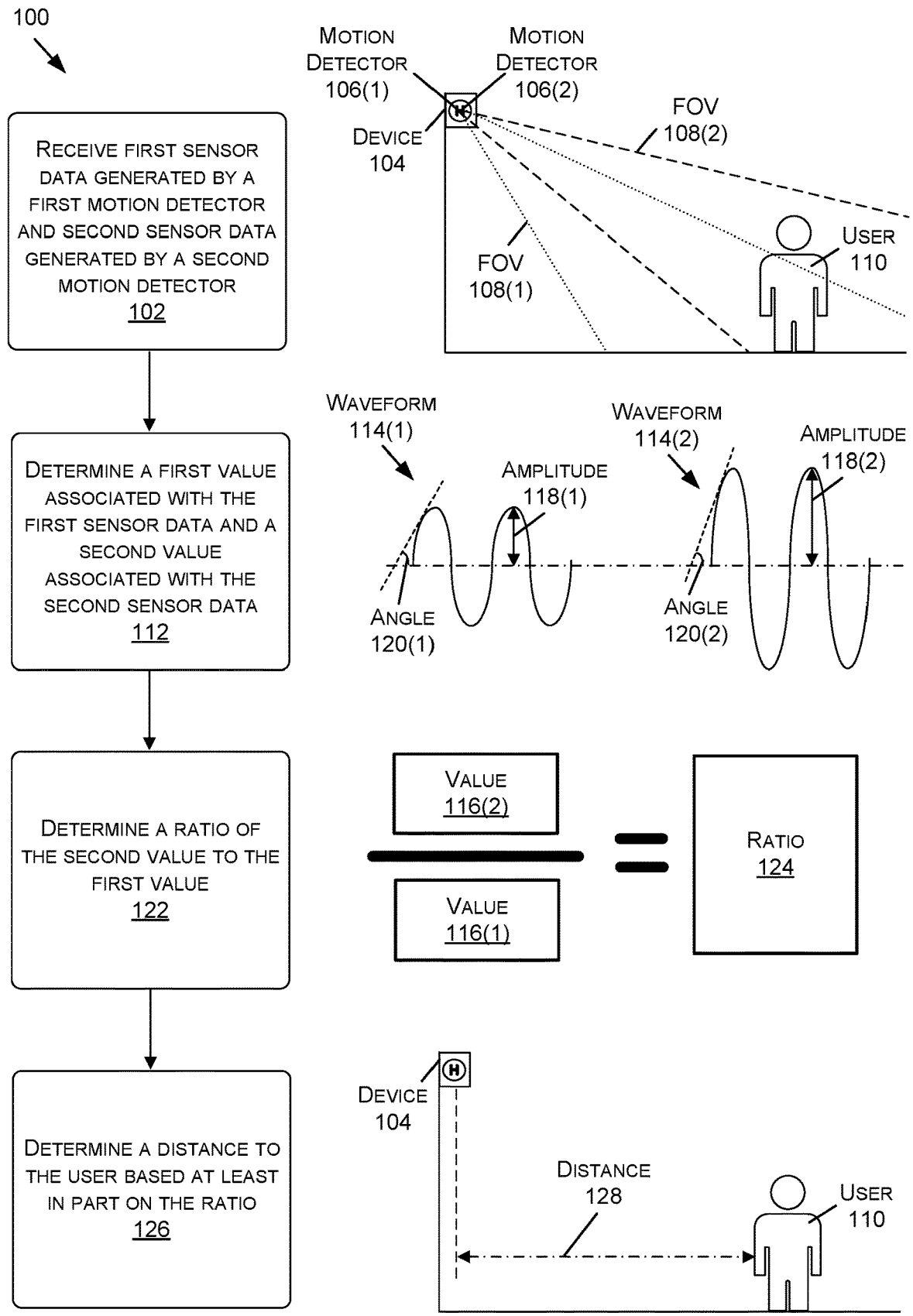
FIG. 1 is a flowchart illustrating an example process for using multiple passive infrared sensors to determine a distance to an object, in accordance with examples of the present disclosure.

This disclosure describes, in part, techniques for determining a distance to an object detected using passive infrared sensors.

A passive infrared sensor may comprise, for example, two pyroelectric sensing elements. Each pyroelectric sensing element comprises a pyroelectric crystal. Each pyroelectric sensing element generates an electrical charge in response to heat. Radiation (e.g. infrared light) received at a surface of a pyroelectric sensing element generates heat, which in turn generates an electrical charge. Put another way, an absorbing layer of a pyroelectric sensing element transforms radiation flux change into a change in temperature and a pyroelectric component performs a thermal to electrical conversion. One or more low-noise and low leakage current field-effect transistors (e.g. JFET) or operational amplifiers are used to convert charge into a signal voltage.

A passive infrared sensor may comprise two pyroelectric sensing elements electrically coupled together with opposite polarization to produce an output. In this way, an equal change in temperature at both of the pyroelectric sensing elements will cancel out in the output signal, thus filtering out temperature changes in the environment. However, a change in temperature at only one of the pyroelectric sensing elements will result in an output signal that is positive or negative (depending on which pyroelectric sensing element experienced the change in temperature).

A passive infrared sensor may include two slots, each providing an optical path to one of the pyroelectric sensing elements. A passive infrared sensor may comprise one or more lenses configured to direct light received at the one or more lenses onto one of the pyroelectric sensing elements. A passive infrared sensor may include one or more lenses configured to direct light received at a first portion of the one or more lenses (e.g. a left portion) onto a first of the pyroelectric sensing elements (e.g. a left sensing element), and to direct light received at a second portion of the one or more lenses (e.g. a right portion) onto a second of the pyroelectric sensing elements (e.g. a right sensing element). The one or more lenses may comprise one or more Fresnel lenses having one or more features configured to direct light. The pyroelectric elements may be positioned side by side and aligned along an axis (e.g. a horizontal axis or a vertical axis).

A passive infrared sensor may be analog, with an analog signal output, or may be digital, with digital data output generated utilizing an analog-to-digital converter (ADC).

An electronic device may include multiple passive infrared sensors that the electronic device uses to detect objects. For example, an electronic device may include two passive infrared sensors with a first infrared sensor positioned above a second infrared sensor.

Each passive infrared sensor may output a signal or sensor data, where the electronic device uses a characteristic determined using the signal or sensor data to determine whether the passive infrared sensor detected an object. As described herein, the characteristic may include a voltage represented by the signal or sensor data, an amplitude of a wave generated or determined using the signal or sensor data, an angle of the wave generated using the signal or sensor data, and/or the like. The electronic device may then use characteristics determined using the signal or sensor data from multiple passive infrared sensors to determine a distance to an object.

For example, a first passive infrared sensor may have a first field-of-view (FOV) that extends a first distance from the electronic device. In some examples, the first FOV is created based on placing the first passive infrared sensor in a first direction and/or using one or more lenses (which may be a lens of the passive infrared sensor or which may be used in addition to or in replacement of a lens of the passive infrared sensor). A second passive infrared sensor may have a second FOV that extends a second distance, further from the electronic device. In some examples, the second FOV is created by placing the first passive infrared sensor in a second direction and/or using one or more lenses (which may be a lens of the passive infrared sensor or which may be used in addition to or in replacement of a lens of the passive infrared sensor).

The electronic device may include one or more lenses configured to direct light received at various first portions of the one or more lenses onto a first of the passive infrared sensors (e.g. a top passive infrared sensor), and to direct light received at various second portions of the one or more lenses onto a second of the passive infrared sensors (e.g. a bottom passive infrared sensor). The one or more lenses may comprise one or more Fresnel lenses having one or more features configured to direct light. The passive infrared sensors may be positioned one above the other aligned along an axis (e.g. an axis perpendicular or orthogonal to an axis along which two pyroelectric sensing elements are aligned side by side) (e.g. a vertical axis).

In accordance with one or more preferred implementations, the first FOV and the second FOV are configured such that the first FOV will encompass a greater portion of a person that is located closer to the electronic device (as compared to the second FOV), while the second FOV will encompass a greater portion of a person that is located further away from the electronic device (as compared to the first FOV). Thermal radiation (comprising infrared light) from the extent of the person that is within the first FOV will be directed by one or more lenses onto the first passive infrared sensor.

For example, in accordance with one or more preferred implementations, as a person passes across the first FOV in a left to right direction, infrared light will be directed first onto a left pyroelectric sensing element of the first passive infrared sensor, causing the first passive infrared sensor to output a signal or data based thereon, and then infrared light will be directed onto a right pyroelectric sensing element of the first passive infrared sensor, causing the first passive infrared sensor to output a signal or data based thereon. Similarly, as the person passes across the second FOV in a left to right direction, infrared light will be directed first onto a left pyroelectric sensing element of the second passive infrared sensor, causing the second passive infrared sensor to output a signal or data based thereon, and then infrared light will be directed onto a right pyroelectric sensing element of the second passive infrared sensor, causing the second passive infrared sensor to output a signal or data based thereon. However, if the first FOV is configured such that it encompasses a greater portion of the person (as compared to the second FOV) because the person is located closer to the electronic device, then the signal or data output from the first passive infrared sensor will comprise a greater value (e.g. a greater voltage) than the signal or data output from the second passive infrared sensor. A ratio of the relative signal or data output from the first and second passive infrared sensors can be utilized to determine a distance of the detected person from the electronic device, if sufficient information is known about signal or data output at various distances given various conditions (e.g. a temperature of a human body, etc.). In accordance with one or more preferred implementations, experimental data regarding signals or data, or relative signals or data, at various distances may be utilized to generate lookup data which may be used to determine a distance, or classes of distance, given an output signal or data, or given characteristics determined based on output signal or data.

In accordance with one or more preferred implementations, one or more Fresnel lens and/or one or more lens arrays define features that are utilized to direct light from various fields of view onto a particular one of the passive infrared sensors. One or more lenses may be shaped, positioned, oriented, and configured to direct light received at the one or more lenses from each particular field of view of various fields of view onto a particular one of the passive infrared sensors. One or more lenses may be shaped, positioned, oriented, and configured to augment a field of view of a passive infrared sensor to encompass one or more desired fields of view.

Figure 11:
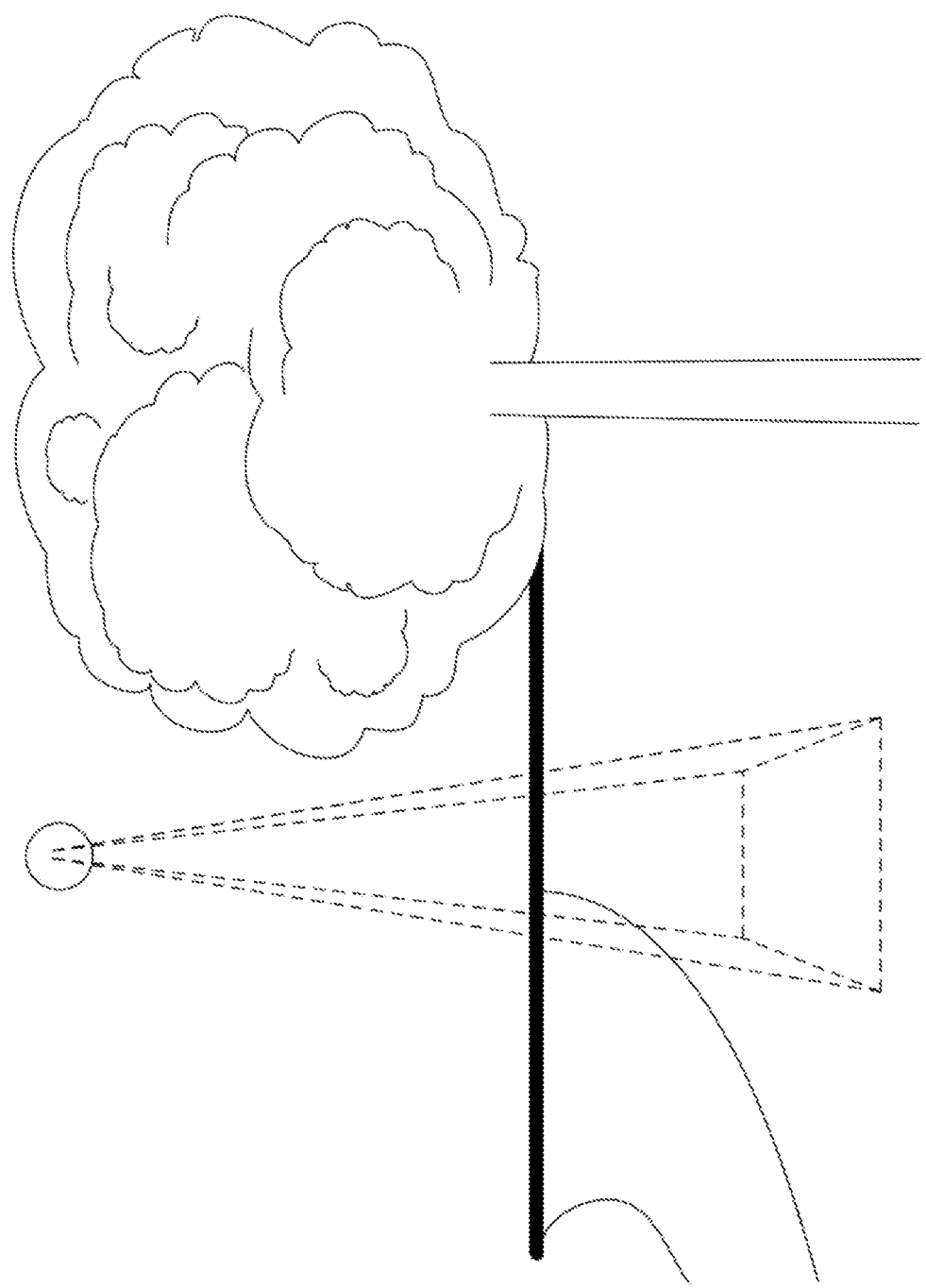
FIG. 11 illustrates an exemplary first field of view at least partially defined by one or more lenses that direct light from the first field of view onto a first passive infrared sensor.
Figure 12:
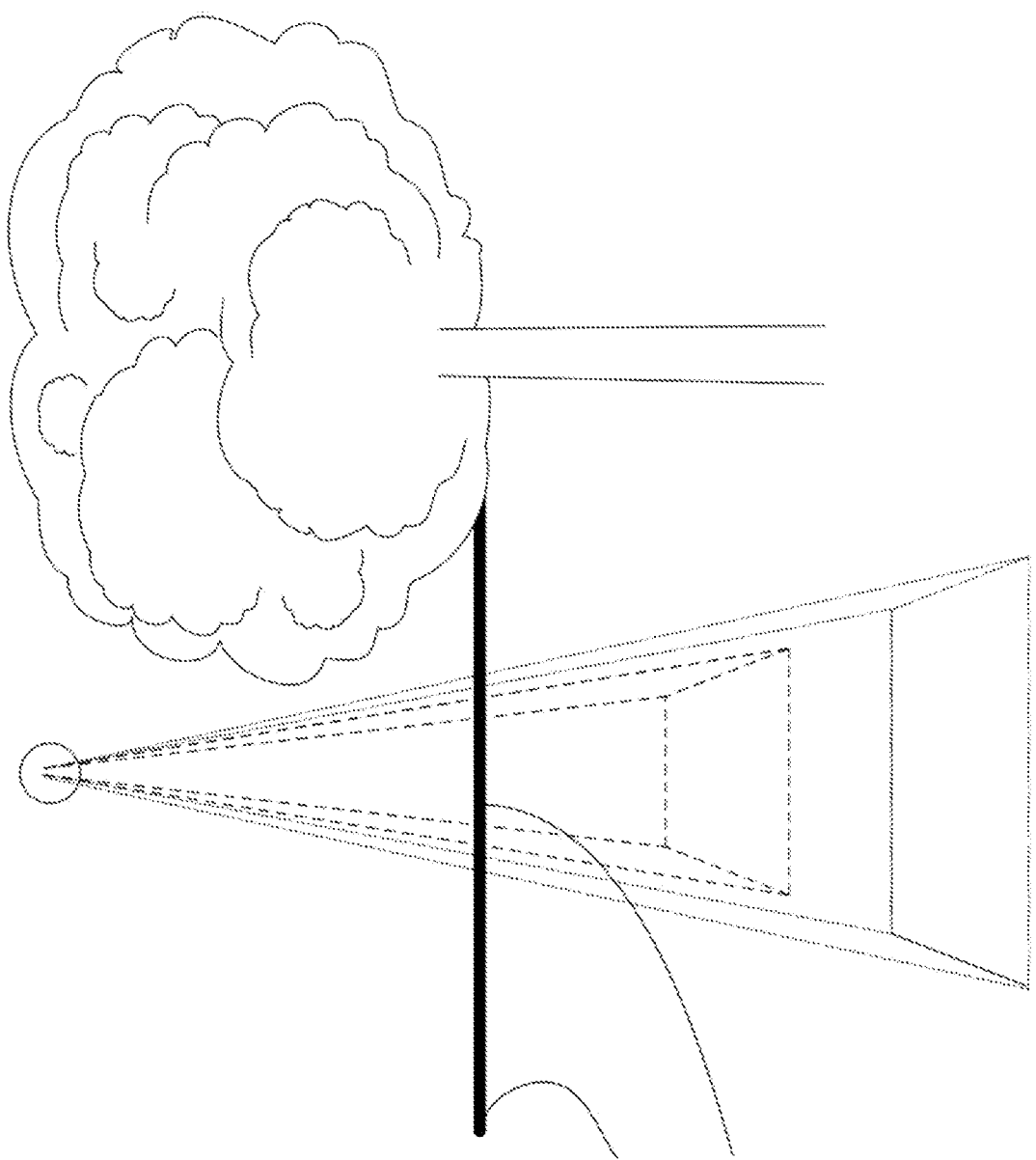
FIG. 12 additionally illustrates an exemplary second field of view at least partially defined by one or more lenses that direct light from the second field of view onto a second passive infrared sensor.

For example, FIG. 11 illustrates an exemplary first field of view at least partially defined by one or more lenses that direct light from the first field of view onto a first passive infrared sensor. FIG. 12 additionally illustrates an exemplary second field of view at least partially defined by one or more lenses that direct light from the second field of view onto a second passive infrared sensor.

In accordance with one or more preferred implementations, a first passive infrared sensor, a second passive infrared sensor, and one or more lenses are shaped, positioned, oriented, and configured to cause a first field of view of the first passive infrared sensor to be vertically aligned with a second field of view of the second passive infrared sensor (e.g. a left side of the first field of view may be generally aligned with a left side of the second field of view and a right side of the first field of view may be generally aligned with a right side of the first field of view).

Figure 13:
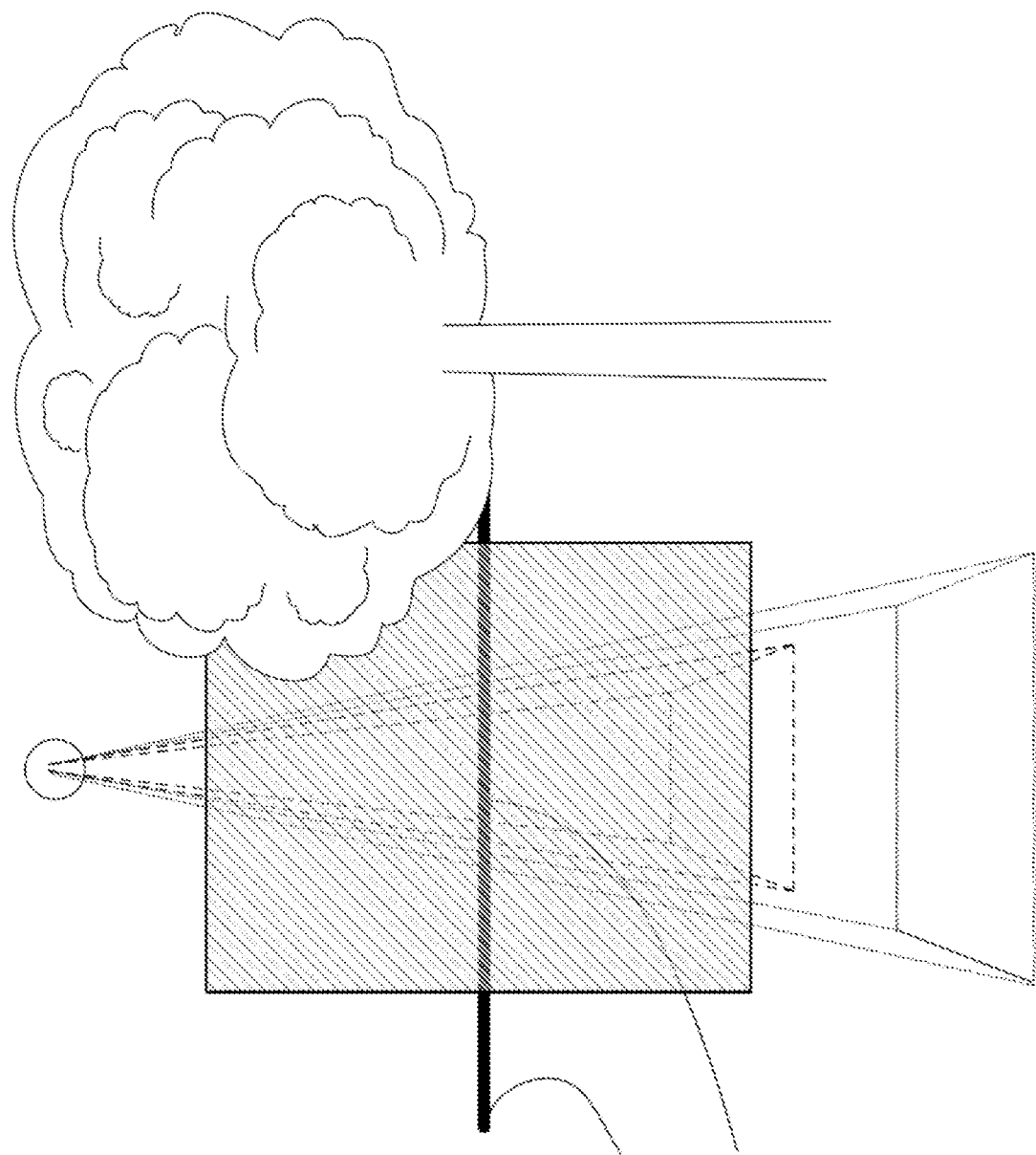
FIG. 13 illustrates a vertical plane intersecting first and second fields of view.

Such vertical alignment can perhaps best be seen when considering a vertical plane intersecting the first and second fields of view, as illustrated in FIG. 13.

Figure 14:
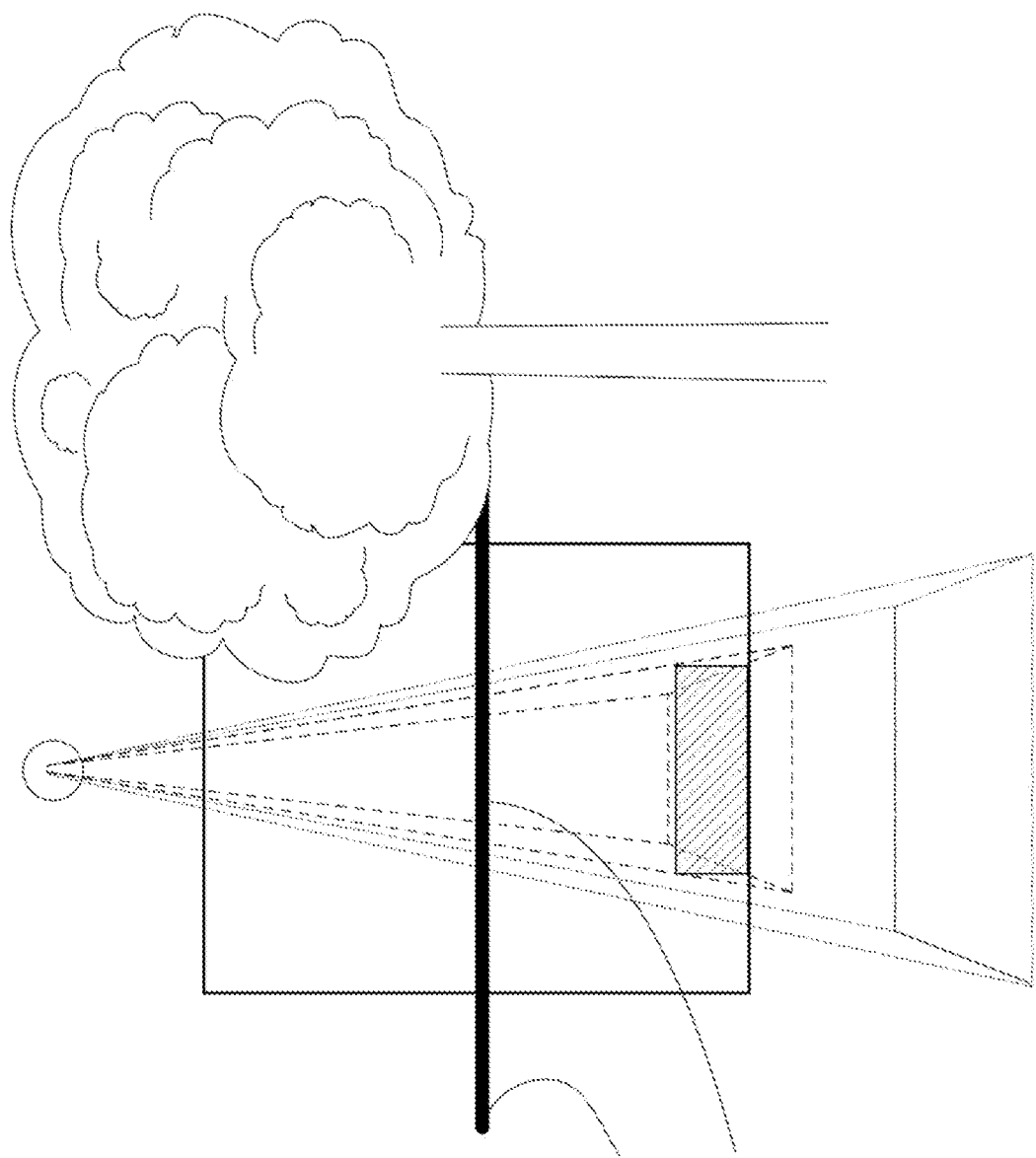
FIG. 14 illustrates a portion of a first field of view that lies along the plane of FIG. 12.
Figure 15:
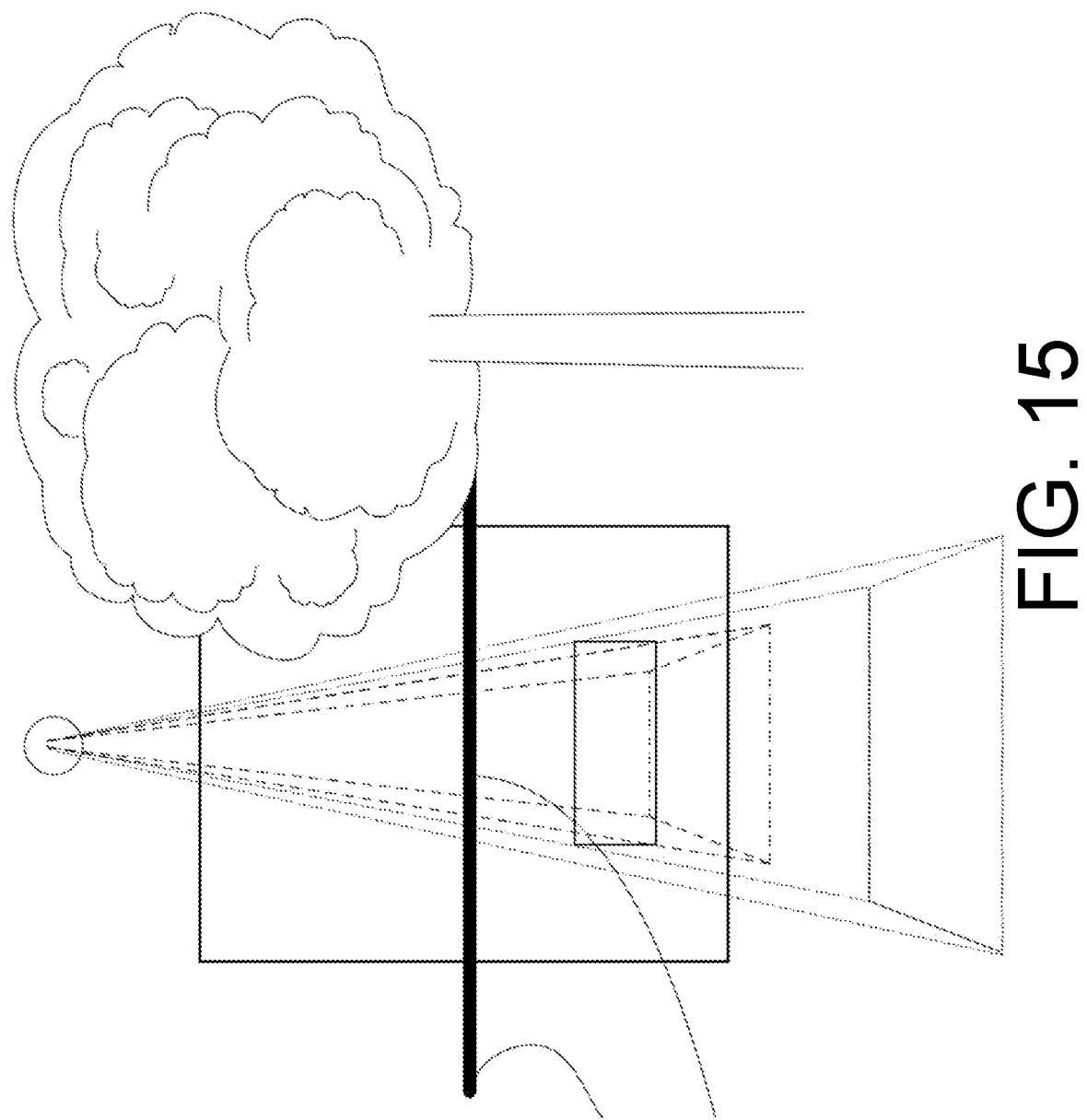
FIG. 15 illustrates a portion of the plane of FIG. 12 that does not intersect either a first field of view or a second field of view.
Figure 16:
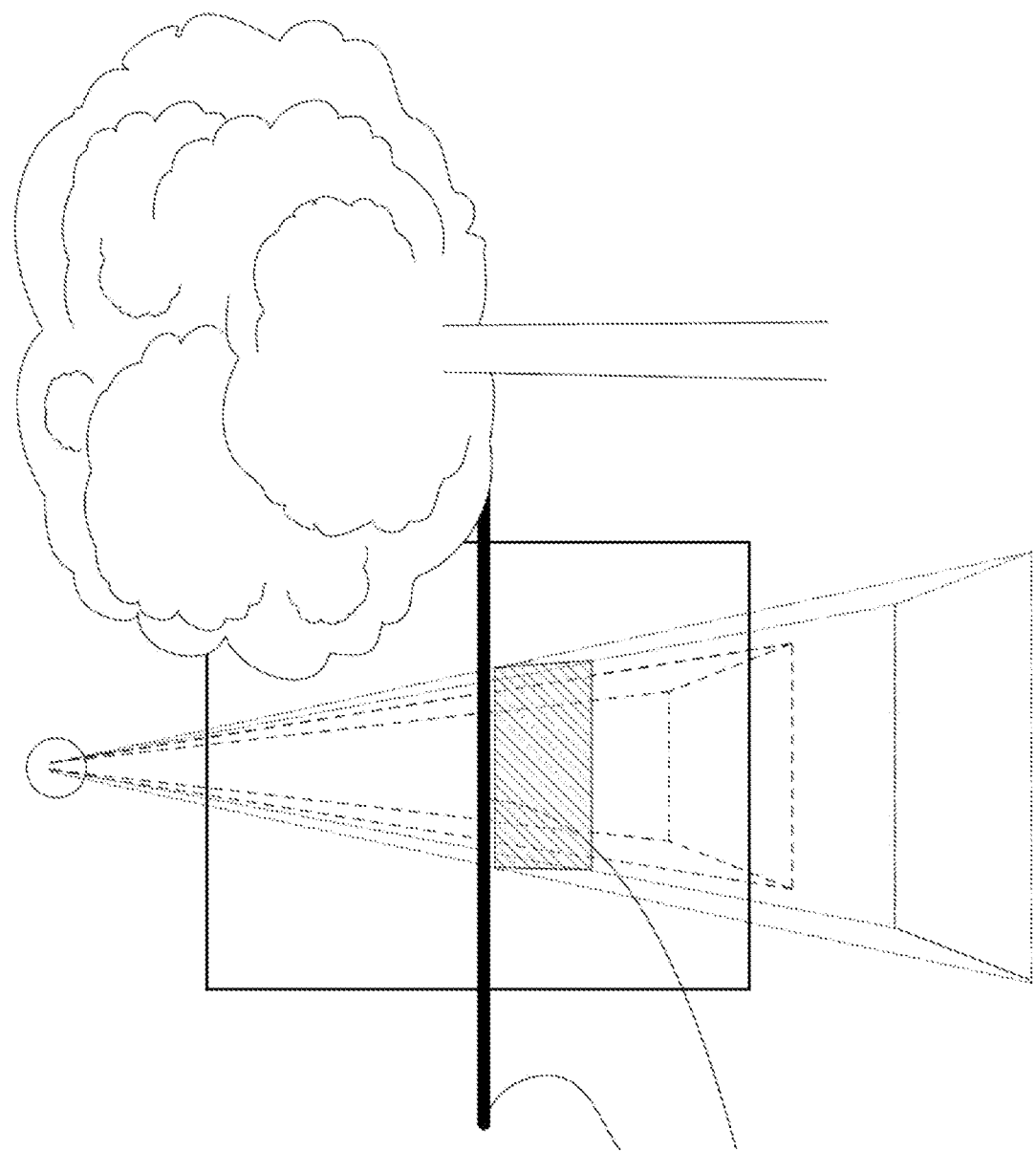
FIG. 16 illustrates a portion of a second field of view that lies along the plane of FIG. 12.
Figure 17:
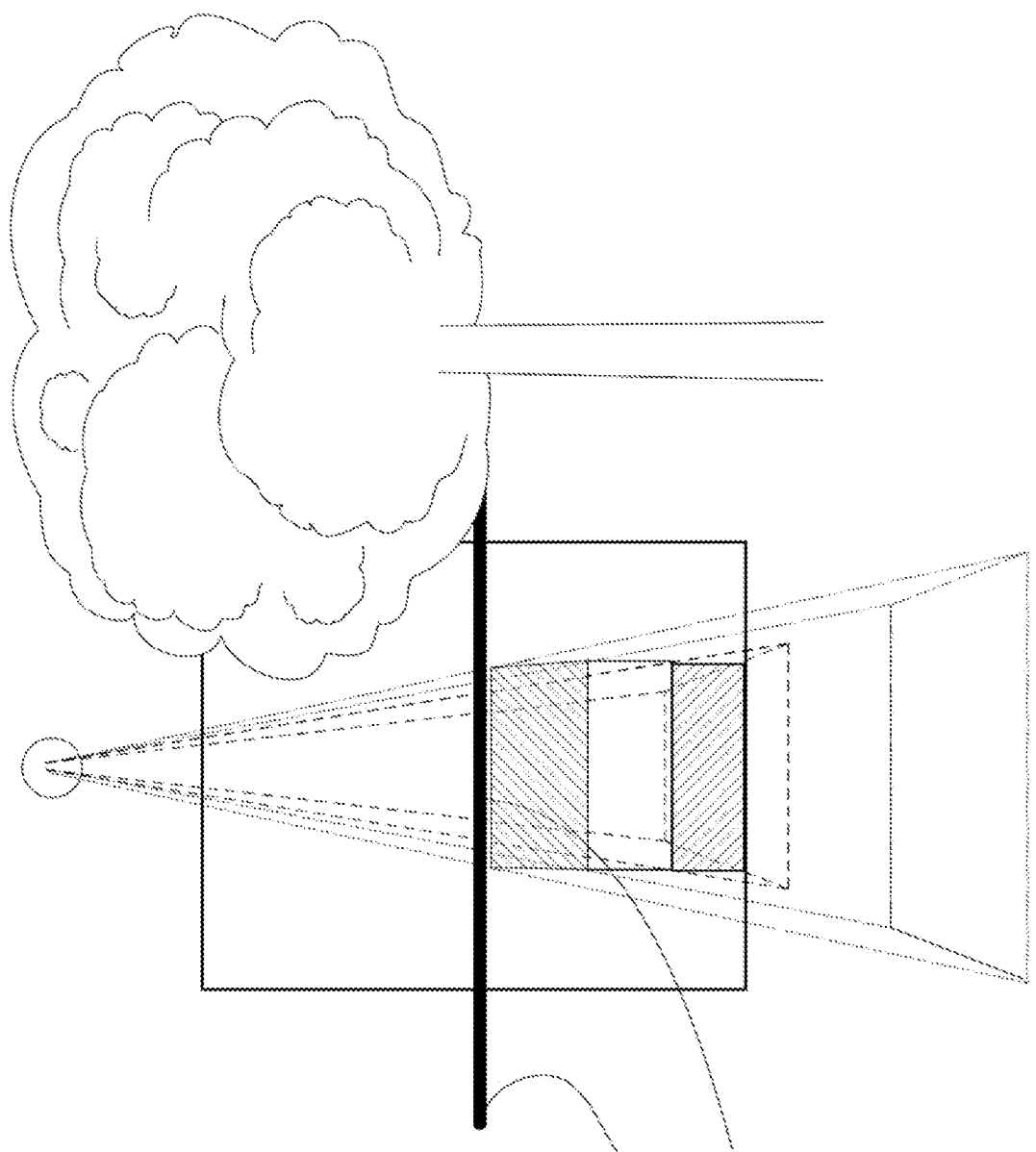
FIGS. 17-18 illustrate the portions of FIGS. 14-16.
Figure 18:
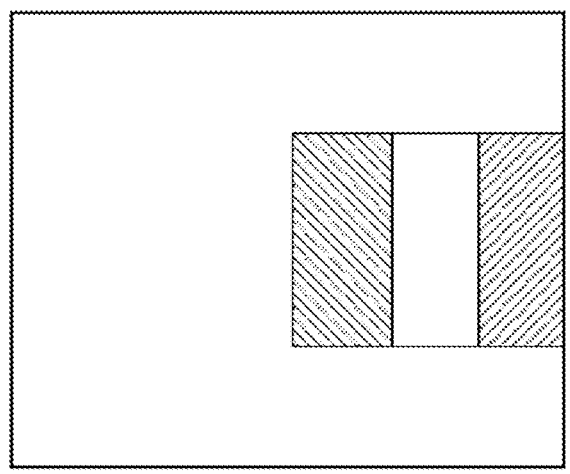

FIG. 14 illustrates a portion of the first field of view that lies along the plane. FIG. 15 illustrates a portion of the plane that does not intersect either the first field of view or the second field of view. FIG. 16 illustrates a portion of the second field of view that lies along the plane. FIGS. 17 and 18 illustrate all of these portions. As illustrated in FIG. 18, the portions of the first and second fields of view that intersect the plane are vertically aligned (e.g. a left side of the first field of view is generally aligned with a left side of the second field of view and a right side of the first field of view is generally aligned with a right side of the first field of view).

Figure 19:
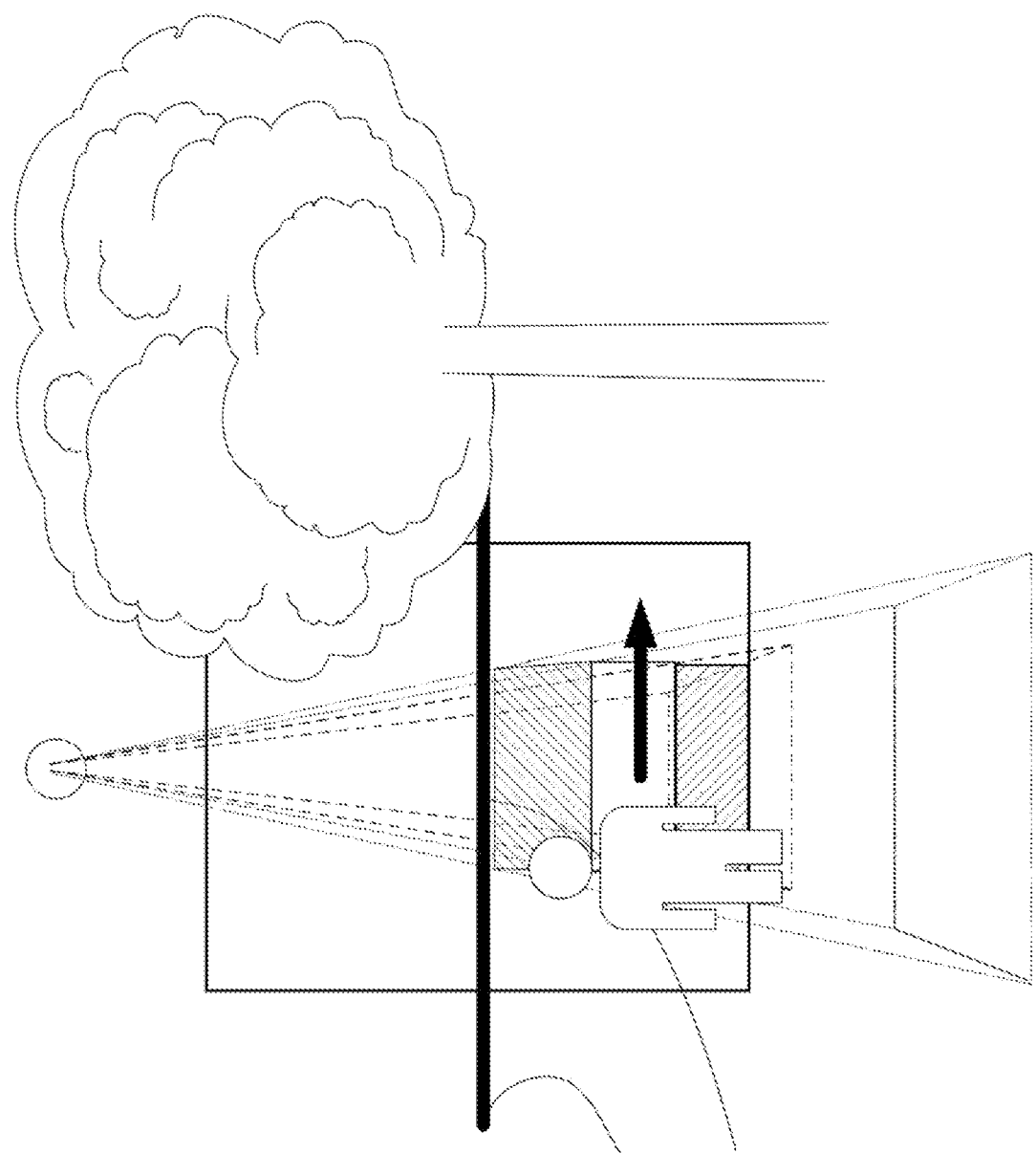
FIG. 19 fancifully illustrates a person walking across first and second fields of view.
Figure 20:
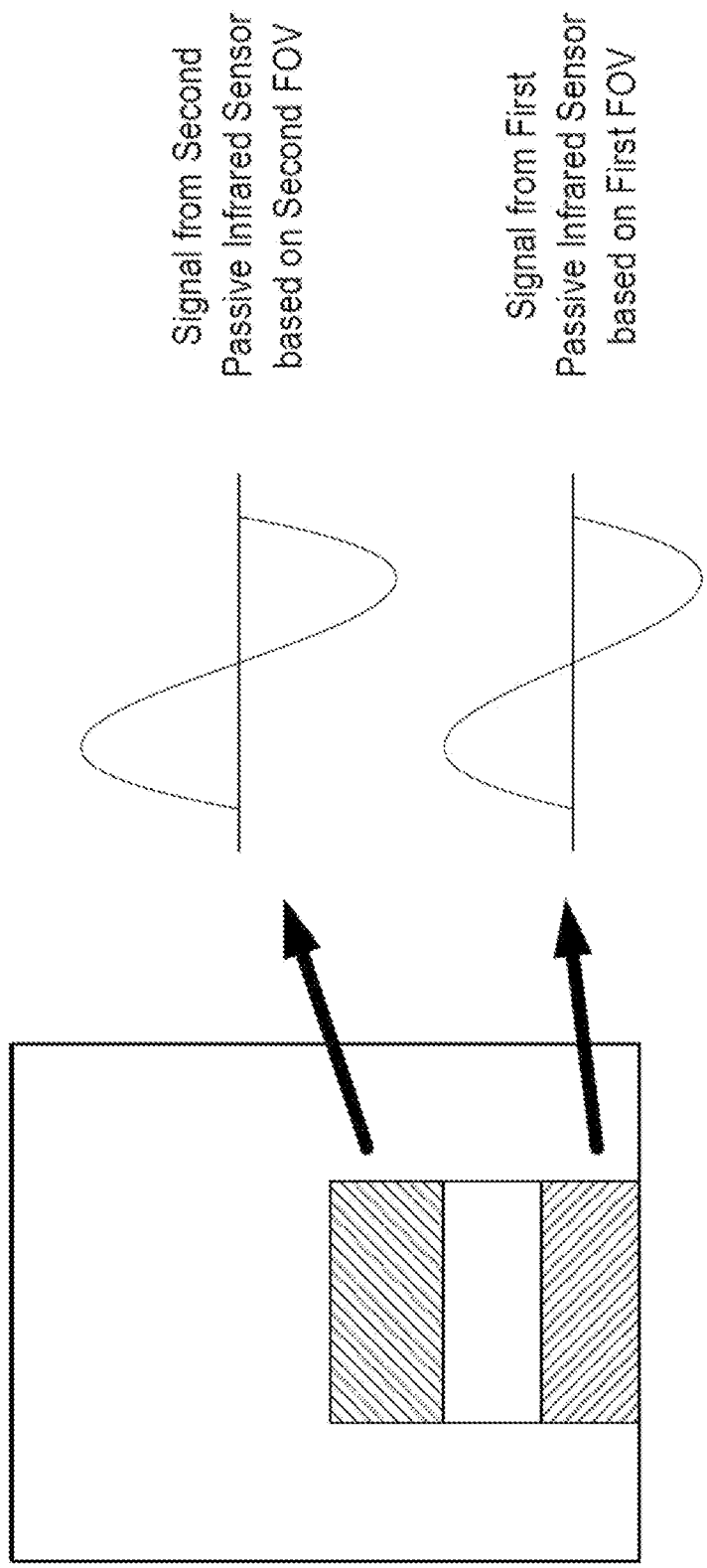
FIG. 20 illustrates signals from first and second passive infrared sensors in phase with one another.
Figure 21:
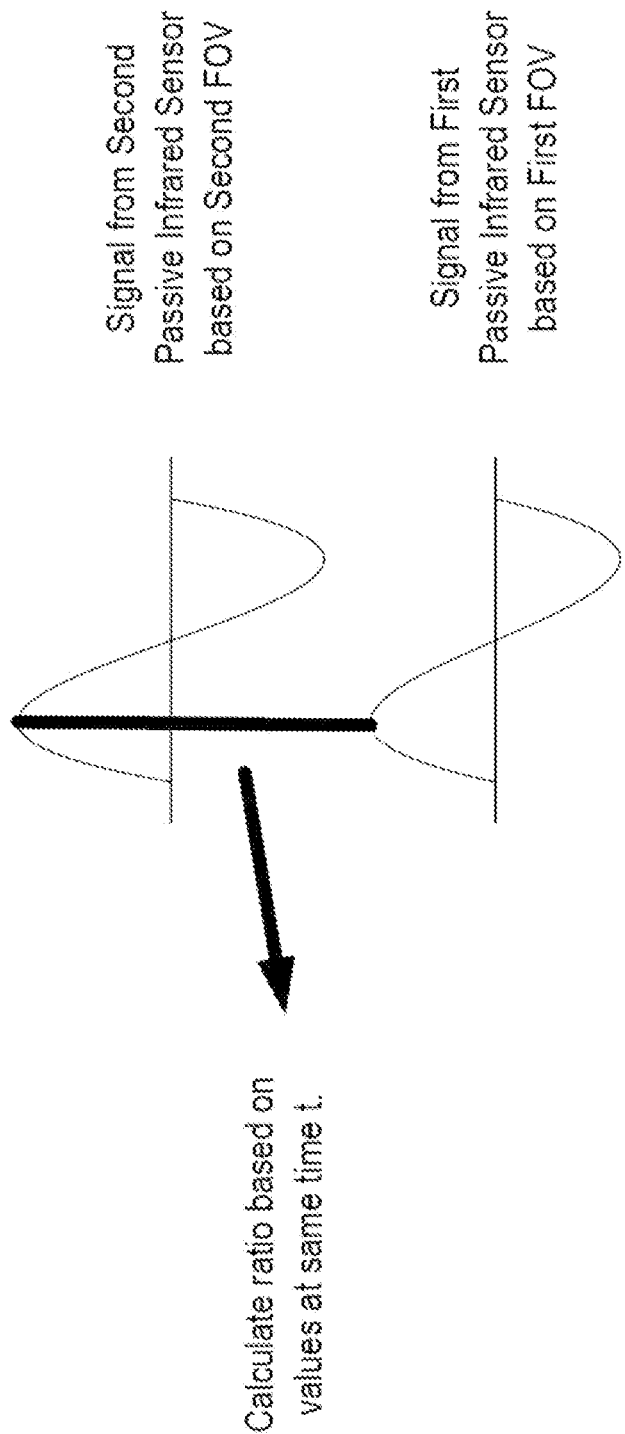
FIG. 21 fancifully illustrates sampling of a signal or data at a time t.

As a result of this vertical alignment, when a person walks across the fields of view as fancifully illustrated in FIG. 19, a signal from the first passive infrared sensor and a signal from the second passive infrared sensor are in phase with one another, as illustrated in FIG. 20. This allows for easy sampling of a signal or data at a particular time t, as illustrated in FIG. 21, in order to calculate a ratio to use to determine a distance (or estimated distance bucket) to a detected person (or determine whether a person is approaching or retreating, e.g. based on a calculated angle).

In accordance with one or more preferred implementations, the electronic device is able to use a signal or sensor data from the first and second passive infrared sensors to determine a distance to a detected object. For example, the electronic device may use a ratio determined based on the signal or sensor data to determine the distance to an object.

It will be appreciated that the illustrations with respect to the first and second field of view are exemplary. In accordance with one or more preferred implementations, an electronic device may be configured to define a first plurality of fields of view of a first passive infrared sensor, and a second plurality of fields of view of a second passive infrared sensor. In accordance with one or more preferred implementations, each of one or more fields of view of the first plurality of fields of view is vertically aligned with one or more respective fields of view of the second plurality of fields of view.

In some examples, the electronic device may then perform one or more processes based on the distances to the objects. For a first example, the electronic device may be configured to send motion alerts and/or generate image data when objects are located within a threshold distance to the electronic device. As such, if the electronic device determines that a distance to an object is within the threshold distance, then the electronic device may send a motion alert and/or generate image data. However, if the electronic device determines that a distance to an object is outside of the threshold distance, then the electronic device may refrain from sending a motion alert and/or generate image data. For a second example, the electronic device may be configured to send motion alerts and/or generate image data when objects are moving towards the electronic device. As such, if the electronic device determines that an object is moving towards the electronic device using two distances, then the electronic device may send a motion alert and/or generate image data. However, if the electronic device determines that an object is moving away from the electronic device using two distances, then the electronic device may refrain from sending a motion alert and/or generate image data.

For more detail, FIG. 1 is a flowchart illustrating an example process 100 for using multiple passive infrared sensors to determine a distance to an object, in accordance with examples of the present disclosure. At 102, the process 100 may include receiving first sensor data generated by a first passive infrared sensor and second sensor data generated by a second passive infrared sensor. For instance, an electronic device 104 may include both a first passive infrared sensor 106(1) and a second passive infrared sensor 106(2). The first passive infrared sensor 106(1) may include a first FOV 108(1) that extends a first distance from the electronic device 104, where the first FOV 108(1) is illustrated by the dotted lines. The second passive infrared sensor 106(2) may include a second FOV 108(2) that extends a second, further distance from the electronic device, where the second FOV 108(2) is illustrated by the dashed lines. In some examples, the first FOV 108(1) is created using a first orientation of the first passive infrared sensor 106(1) and the second FOV 108(2) is created using a second orientation of the second passive infrared sensor 106(2). In some examples, the first FOV 108(1) is created using a first lens associated with the first passive infrared sensor 106(1) and the second FOV 108(2) is created using a second lens associated with the second passive infrared sensor 106(2).

As shown, a user 110 may enter both the first FOV 108(1) of the first passive infrared sensor 106(1) and the second FOV 108(2) of the second passive infrared sensor 106(2). As such, the electronic device 106 may detect the presence of the user 110 using both the first passive infrared sensor 106(1) and the second passive infrared sensor 106(2). However, and as shown, a greater portion of the user 110 may be located within the second FOV 108(2) of the second passive infrared sensor 106(2) than in the first FOV 108(1) of the first passive infrared sensor 106(1).

At 112, the process 110 may include determining a first value associated with the first sensor data and a second value associated with the second sensor data. For instance, a first signal represented by the first sensor data may include a first waveform 114(1) and a second signal represented by the second sensor data may include a second waveform 114(2). As such, the electronic device 104 may analyze the first waveform 114(1) to determine a first value 116(1). In the example of FIG. 1, the first value 116(1) may include a first amplitude 118(1) of the first waveform 114(1), a first angle 120(1) of the first waveform 114(1), and/or any other characteristic associated with the first waveform 114(1). The electronic device 104 may also analyze the second waveform to determine a second value 116(2). In the example of FIG. 1, the second value 116(2) may include a second amplitude 118(2) of the second waveform 114(2), a second angle 120(2) of the second waveform 114(2), and/or any other characteristic associated with the second waveform 114(2).

While the example of FIG. 1 illustrates the first value 116(1) as including a characteristic of the first waveform 114(1) and the second value 116(2) as including a characteristic of the second waveform 114(2), in other examples, the electronic device 104 may determine the first value 116(1) and/or the second value 116(2) using additional and/or alternative techniques. For example, the electronic device 104 may determine the first value 116(1) as a first voltage associated with the first sensor data and the second value 116(2) as a second voltage associated with the second sensor data. For another example, the electronic device 104 may determine the first value 116(1) as a first current associated with the first sensor data and the second value 116(2) as a second current associated with the second sensor data.

At 122, the process 100 may include determining a ratio of the second value to the first value. For instance, the electronic device 104 may determine a ratio 124 between the second value 116(2) and the first value 116(1). In some examples, the ratio 124 is smaller the closer the user 110 is to the electronic device 104. This is because the closer the user 110 is to the electronic device 104, the larger the first value 116(1) and the smaller the second value 116(2) (e.g., the first detector 106 detects a greater portion of the user 110 than the second detector 106). Additionally, the ratio 124 is larger the further the user 110 is from the electronic device 104. This is because the further the user 110 is from the electronic device 104, the larger the second value 116(2) and the smaller the first value 116(1) (e.g., the second detector 106 detects a greater portion of the user 110 than the first detector 106).

While the example of FIG. 1 describes using the second value 116(2) and the first value 116(1) to determine the ratio 124, in other examples, the electronic device 104 may use the first value 116(1) and the second value 116(2) to determine a final value other than the ratio 124. For example, the electronic device 104 may determine a final value by multiplying the first value 116(1) times the second value 116(2), averaging the first value 116(1) and the second value 116(2), subtracting the first value 116(1) by the second value 116(2) or the second value 116(2) by the first value 116(1), adding the first value 116(1) and the second value 116(2), and/or using one or more additional and/or alternative equations.

At 126, the process 100 may include determining a distance to the user based at least in part on the ratio. For instance, the electronic device 104 may determine a distance 128 from the electronic device 104 to the user 110 based on the ratio 124. In some examples, to determine the distance 128, the electronic device 104 may store data that associates various ratios with various distances. For example, the data may associate a first ratio with a first distance to an object, a second ratio with a second distance to an object, a third ratio with a third distance to an object, and/or so forth. In such examples, the electronic device 104 may use the data to determine that the ratio 124 is associated with the distance 128. As such, the electronic device 104 may determine that the user 110 is the distance 128 from the electronic device 104.

Additionally, or alternatively, in some examples, the electronic device 104 may use one or more equations to determine the distance 128 using the ratio 124. For example, the electronic device 104 may use a linear equation, a radical equation, an exponential equation, and/or any other type of equation that is configured to determine distances to objects based on the ratios. In such examples, the electronic device 104 may input the ratio 124 into the equation in order to determine the distance 128. As such, the electronic device 104 may determine that the user 110 is the distance 128 from the electronic device 104.

In some examples, the electronic device 104 may continue to perform the processes described herein in order to continue determining the distances that the user 110 is from the electronic device 104. The electronic device 104 may then use the distances to perform one or more processes. For a first example, the electronic device 104 may use the distances to determine a direction of motion associated with the user 110. For instance, if the distances are decreasing, then the electronic device 104 may determine that the user 110 is moving towards the electronic device 104. However, if the distances are increasing, then the electronic device 104 may determine that the user 110 is moving away from the electronic device 104.

For a second example, the electronic device 104 may determine whether to generate a motion alert and/or generate image data using the distance(s). For instance, in some examples, the electronic device 104 may determine to generate a motion alert and/or generate image data based on the user 110 being within a threshold distance to the electronic device 104. As such, and in the example of FIG. 1, the electronic device 104 may compare the distance 128 to the threshold distance. If the distance satisfies (e.g., is less than or equal to) the threshold distance, then the electronic device 104 may generate the motion alert and/or the image data. However, if the distance does not satisfy (e.g., is greater than) the threshold distance, then the electronic device 104 may refrain from generating the motion alert and/or image data.

In accordance with one or more preferred implementations, methodologies described herein may be utilized with electronic devices utilizing other motion detectors including, for example active infrared sensors, other types of passive infrared sensors, and/or any other type of infrared sensors. As described herein, an active infrared sensor may be configured to emit infrared radiation and then detect the emitted infrared radiation. As such, the active infrared sensor may include at least two parts, a light source (e.g., a light-emitting diode) and a receiver. During operation, when an object comes within proximity to the active infrared sensor, the infrared light that is emitted by the light source is reflected off of the object and detected by the receiver. The electronic device 104 is then able to analyze sensor data that is output by the active infrared sensor in order to detect the presence of the object.

In accordance with one or more preferred implementations, a passive infrared sensor may be configured to detect infrared light without emitting the infrared light using a light source. In accordance with one or more preferred implementations, a passive infrared sensor may include two strips of pyroelectric material, an infrared sensor, a lens (e.g., a Fresnel lens), and a housing. The infrared sensor may be configured to block wavelengths of light other than the wavelengths of infrared light. Additionally, the lens may be configured to collect infrared light from many angles and then direct that light to a single point, such as towards the pyroelectric material. As such, when an object moves within proximity to the passive infrared sensor, the object generates infrared light that is captured by the passive infrared sensor. The difference in the infrared levels between the two pyroelectric elements is then measured. As described herein, the electronic device 104 may then analyze sensor data that is output by the passive infrared sensor in order to detect the presence of the object.

While the examples above are described with respect to the passive infrared sensors 106, in other examples, the any other type of motion detector may be utilized.

Figure 2A:
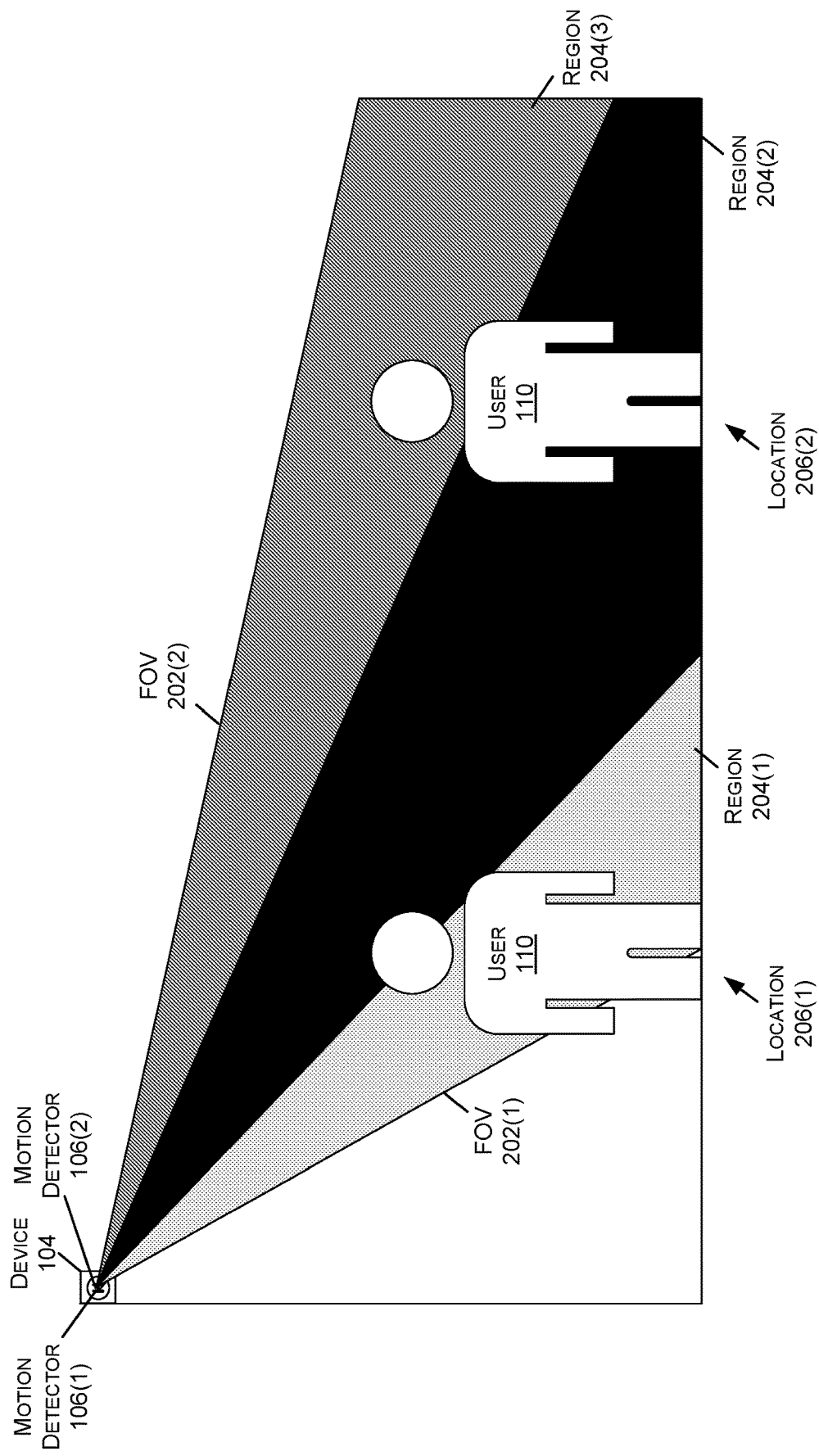
FIG. 2A illustrates an example of an electronic device that includes overlapping fields-of-view for passive infrared sensors, in accordance with examples of the present disclosure.

In some examples, the passive infrared sensors 106 of the electronic device 104 may be configured in order to create different FOVs for the passive infrared sensors 106. For instance, FIG. 2A illustrates an example of the electronic device 104 including overlapping FOVs for the passive infrared sensors 106, in accordance with examples of the present disclosure. In the example of FIG. 2A, the first passive infrared sensor 106(1) may include a first FOV 202(1) that is represented by both a first region 204(1) (e.g., the light-grey region) and a second region 204(2) (e.g., the black region). The second passive infrared sensor 106(2)

may include a second FOV 202(2) that is represented by both a third region 204(3) (e.g., the dark-grey region) and the second region 204(2). As such, the overlapping of the first FOV 202(1) of the first passive infrared sensor 106(1) and the second FOV 202(2) of the second passive infrared sensor 106(2) is represented by the second region 204(2).

By including the overlapping second region 204(2), both passive infrared sensors 106 are able to detect objects when the objects are located close to the electronic device 104 (e.g., within two meters) and when the objects are located far from the electronic device 104 (e.g., further than six meters). For example, and as shown, both the passive infrared sensors 106 are able to detect the user 110 at a first, close location 206(1) to the electronic device 104 and at a second, further location 206(2) from the electronic device 104. This may increase the accuracy of the electronic device 104 when determining the locations of the user 110, since each of the passive infrared sensors 106 will generate sensor data representing values associated with the user 110. As such, the electronic device 104 is able to perform the processes described herein to determine the locations of the user 110 using the values.

Figure 2B:
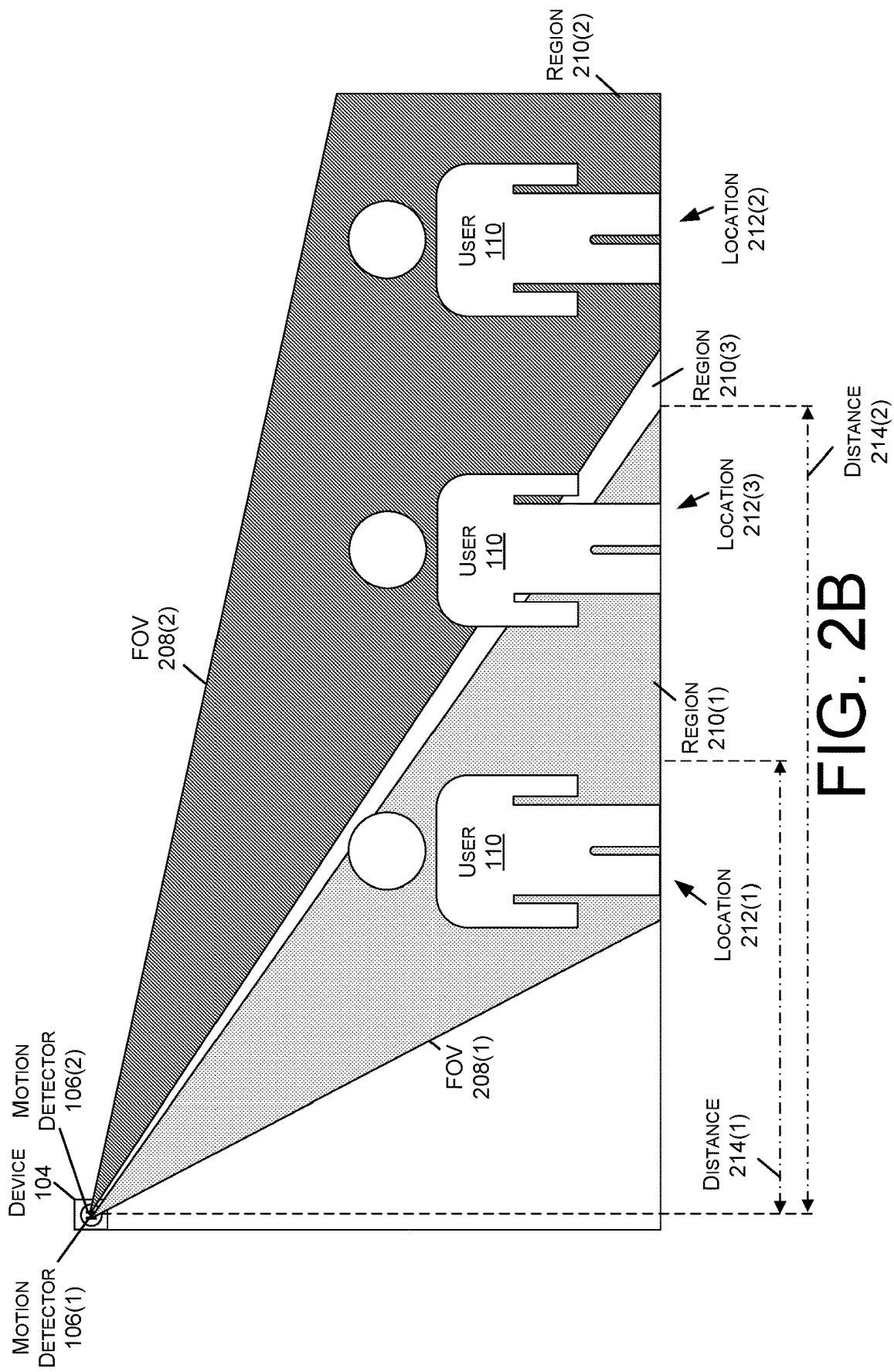
FIG. 2B illustrates an example of an electronic device that includes non-overlapping fields-of-view for passive infrared sensors, in accordance with examples of the present disclosure.

Additionally, FIG. 2B illustrates an example of the electronic device 104 including non-overlapping FOVs for the passive infrared sensors 106, in accordance with examples of the present disclosure. In the example of FIG. 2B, the first passive infrared sensor 106(1) may include a first FOV 208(1) that is represented by a first region 210(1) (e.g., the light-grey region). The second passive infrared sensor 106(2) may include a second FOV 208(2) that is represented a second region 210(2) (e.g., the dark-grey region). As such, the first FOV 208(1) of the first passive infrared sensor 106(1) does not overlap with the second FOV 208(2) of the second passive infrared sensor 106(2) (e.g., there is a region 210(3) that separates the first FOV 208(1) from the second FOV 208(2)).

By including the configurating of FIG. 2B, different variations of the passive infrared sensors 106 are able to detect objects when the objects are located close to the electronic device 104 (e.g., within two meters) and when the objects are located far from the electronic device 104 (e.g., further than six meters). For example, when the user 110 is located at a first, closer location 212(1) from the electronic device 104, the first passive infrared sensor 106(1) is able to detect the user 110 while the second passive infrared sensor 106 may not detect the user 110. As such, the electronic device 104 may determine that the user 110 is within a first distance 214(1) from the electronic device 104. To make this determination, the electronic device 104 may determine that the first value 116(1) associated with the first passive infrared sensor 106(1) is large while the second value 116(2) associated with the second passive infrared sensor 106(2) is zero or small. As such, the electronic device 104 may determine that the ratio 124 is also small. Because of this, the electronic device 104 may determine that the user 110 is within the first distance 214(1).

Additionally, when the user 110 is located at a second, further location 212(2) from the electronic device 104, the second passive infrared sensor 106(2) is able to detect the user 110 while the first motion sensor 106 may not be able to detect the user 110. As such, the electronic device 104 may determine that the user 110 further than a second distance 214(2) from the electronic device 104. To make this determination, the electronic device 104 may determine that the first value 116(1) associated with the first passive infrared sensor 106(1) is small (e.g., the electronic device 104 may use a minimum threshold for the first value 116(1)) and the second value 116(2) for the second passive infrared sensor 106(2) is large. As such, the electronic device 104 may determine that the ratio 124 is also large. Because of this, the electronic device 104 may determine that the user 110 is further from the second distance 214(2) from the electronic device 106.

Furthermore, when the user 110 is located at a third location 212(3) from the electronic device 104, the first passive infrared sensor 106(1) and the second passive infrared sensor 106(2) are both able to detect the user 110. As such, the electronic device 104 may determine a distance to the user 110 that is between the first distance 214(1) and the second distance 214(2). To make this determination, the electronic device 104 may determine the first value 116(1) associated with the first passive infrared sensor 106(1), where the first value 116(1) will depend on the location of the user 110 between the first location and the second location, and the second value 116(2) associated with the second passive infrared sensor 106(2), where the second value 116(2) will also depend on the location of the user 110 between the first location 214(1) and the second location 214(2). The electronic device 104 may then perform the processes described herein to determine the ratio 124 and use the ratio 124 to determine the distance to the user 110.

In the examples of FIGS. 2A and 2B, the electronic device 104 may be located at least a specific distance from a ground plane. For instance, the electronic device 104 may be located at least three meters from the ground plane. In such examples, the electronic device 104 may include a security camera that is capable of operating as intended without user interaction. However, in other examples, the electronic device 104 may include a different type of device, such as a video doorbell, that is configured to operate based on user interaction. For instance, the electronic device 104 may be configured to receive inputs from users 110, such as by pressing a doorbell button. In these examples, the electronic device 104 may be located closer to the ground plane, such as one meter from the ground plane, so that users are able to interact with the electronic device 104.

Figure 3A:
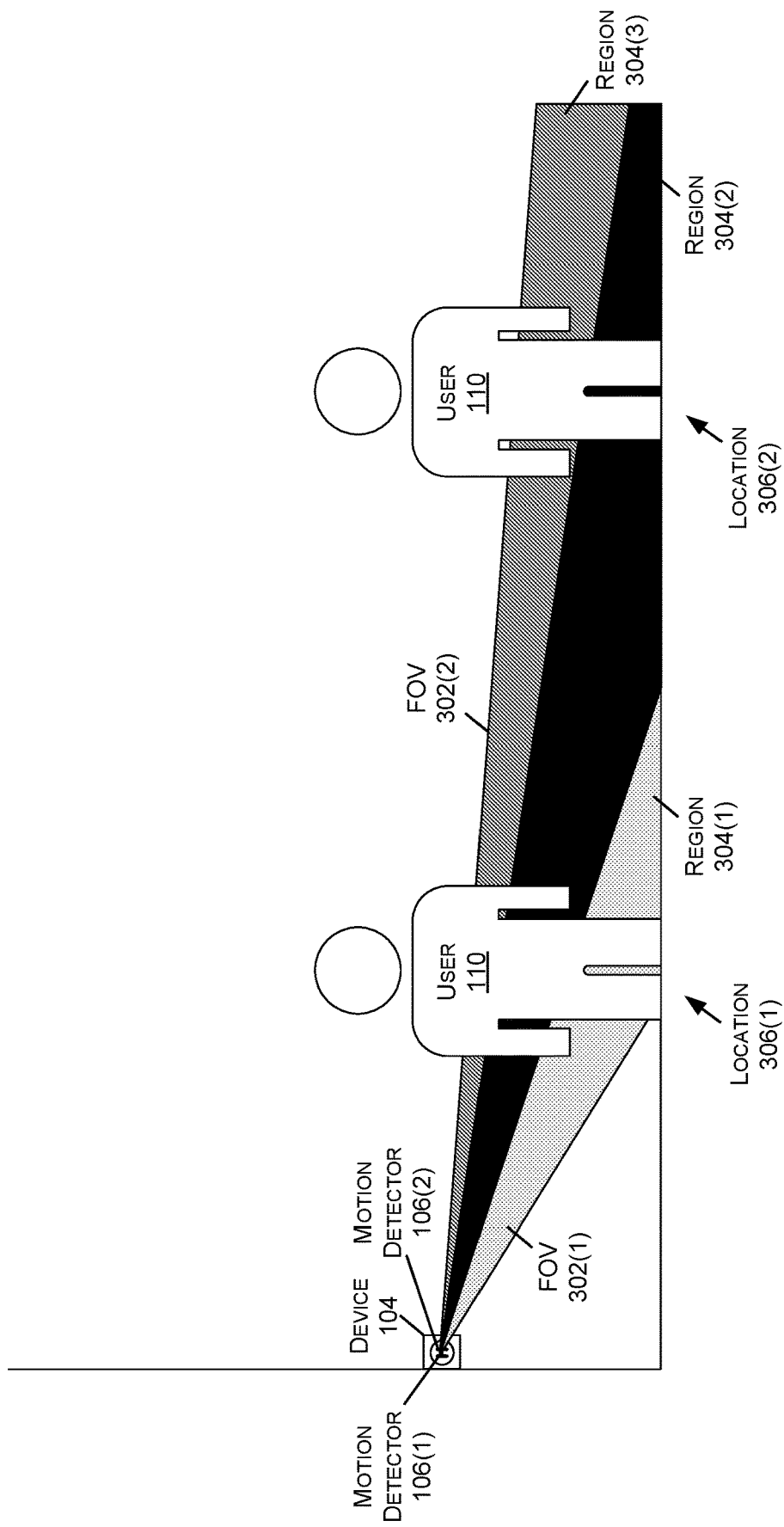
FIG. 3A illustrates an example of an electronic device, such as a video doorbell, that includes overlapping fields-of-view for passive infrared sensors, in accordance with examples of the present disclosure.

As such, FIG. 3A illustrates an example of the electronic device 104 including overlapping FOVs for the passive infrared sensors 106, such as when the electronic device 104 includes a video doorbell, in accordance with examples of the present disclosure. In the example of FIG. 3A, the first passive infrared sensor 106(1) may include a first FOV 302(1) that is represented by both a first region 304(1) (e.g., the light-grey region) and a second region 304(2) (e.g., the black region). The second passive infrared sensor 106(2) may include a second FOV 302(2) that is represented by both a third region 304(3) (e.g., the dark-grey region) and the second region 304(2). As such, the overlapping of the first FOV 304(1) of the first passive infrared sensor 106(1) and the second FOV 304(2) of the second passive infrared sensor 106(2) is represented by the second region 304(2).

By including the overlapping second region 304(2), both passive infrared sensors 106 are able to detect objects when the objects are located close to the electronic device 104 (e.g., within two meters) and when the objects are located far from the electronic device 104 (e.g., further than six meters). For example, and as shown, both the passive infrared sensors 106 are able to detect the user 110 at a first, close location 306(1) from the electronic device 104 and at a second, further location 306(2) from the electronic device 104. This may increase the accuracy of the electronic device 104 when determining the locations of the user 110, since each of the passive infrared sensors 106 will generate sensor data representing values associated with the user 110. As such, the electronic device 104 is able to perform the processes described herein to determine the locations of the user 110 using the values.

Figure 3B:
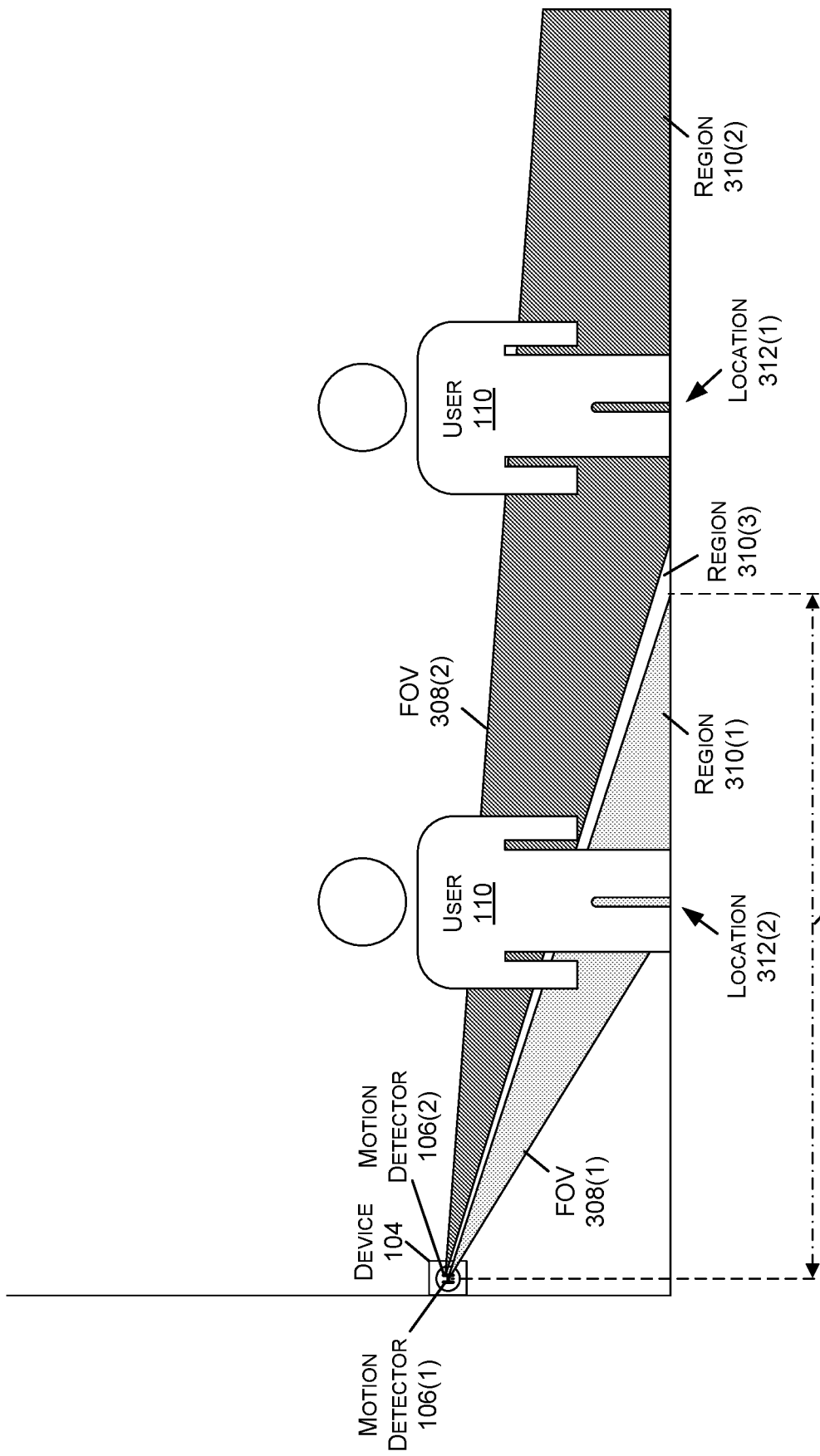
FIG. 3B illustrates an example of an electronic device, such as a video doorbell, that includes non-overlapping fields-of-view for passive infrared sensors, in accordance with examples of the present disclosure.

FIG. 3B illustrates an example of the electronic device 104 including non-overlapping FOVs for the passive infrared sensors 106, such as when the electronic device 104 again includes a video doorbell, in accordance with examples of the present disclosure. In the example of FIG. 3B, the first passive infrared sensor 106(1) may include a first FOV 308(1) that is represented by a first region 310(1) (e.g., the light-grey region). The second passive infrared sensor 106(2) may include a second FOV 308(2) that is represented a second region 310(2) (e.g., the dark-grey region). As such, the first FOV 308(1) of the first passive infrared sensor 106(1) does not overlap with the second FOV 308(2) of the second passive infrared sensor 106(2) (e.g., there is a region 310(3) that separates the first FOV 308(1) from the second FOV 308(2)).

By including the configuration of FIG. 3B, different variations of the passive infrared sensors 106 are able to detect objects when the objects are located close to the electronic device 104 (e.g., within two meters) and when the objects are located far from the electronic device 104 (e.g., further than six meters). For example, when the user 110 is located at a first, further location 312(1) from the electronic device 104, the second passive infrared sensor 106(2) is able to detect the user 110 while first second motion sensor 106 may not detect the user 110. As such, the electronic device 104 may determine that the user 110 is at least a distance 314 from the electronic device 104. To make this determination, the electronic device 104 may determine that the second value 116(2) associated with the second passive infrared sensor 106(2) is large while the first value 116(1) associated with the first passive infrared sensor 106(1) is small (e.g., the electronic device 104 may use a minimum threshold for the first value 116(1)). As such, the electronic device 104 may determine that the ratio 124 is also large. Because of this, the electronic device 104 may determine that the user 110 is at least the distance 314 from the electronic device.

Additionally, when the user 110 is located at a second, closer location 312(2) from the electronic device 104, both the first passive infrared sensor 106(1) and the second passive infrared sensor 106(2) may detect the user 110. As such, the electronic device 104 may determine a distance to the user 110 that is less than the distance 314. For example, the electronic device 104 may determine the first value 116(1) associated with the first passive infrared sensor 106(1) and the second value 116(2) associated with the second passive infrared sensor 106(2), using one or more of the processes described herein. The electronic device 104 may then determine the ratio 124 using the first value 116(1) and the second value 116(2). In the example of FIG. 3B, the closer the user 110 is to the electronic device 104, the smaller the ratio 124 (e.g., the first value 116(1) increases the closer the user 110 is to the electronic device 104 while the second value 116(2) decreases), and the further the user 110 is from the electronic device 104, the larger the ratio 124 (e.g., the second value 116(2) increases the closer the user 110 is to the electronic device 104 while the first value 116(1) decreases). As such, the electronic device 104 may again use one or more of the processes described herein to determine the distance to the user 110 at the second location 312(2).

Figure 3C:
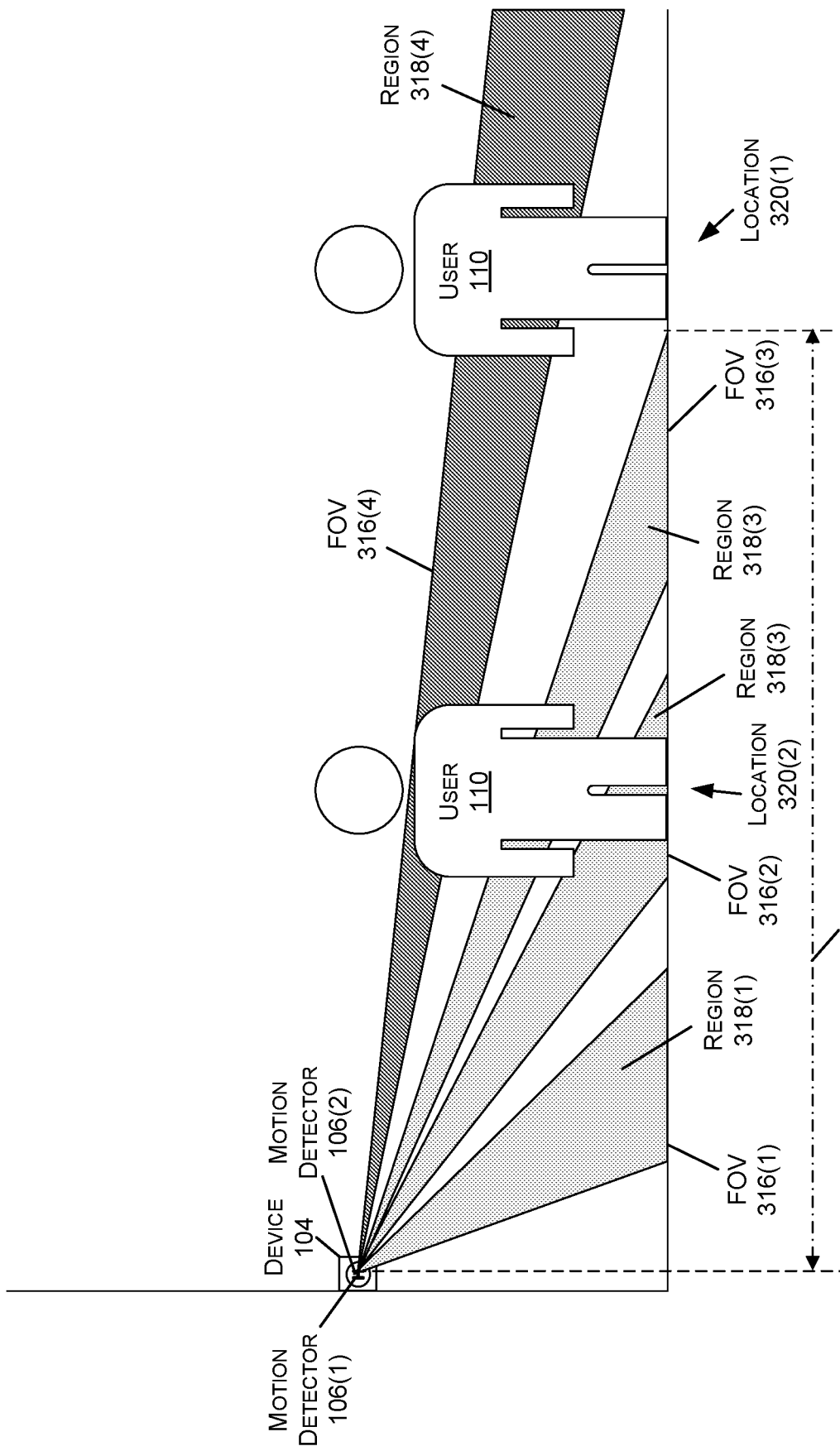
FIG. 3C illustrates an example of an electronic device, such as a video doorbell, that includes non-overlapping fields-of-view and blockers for passive infrared sensors, in accordance with examples of the present disclosure.
Figure 4A:
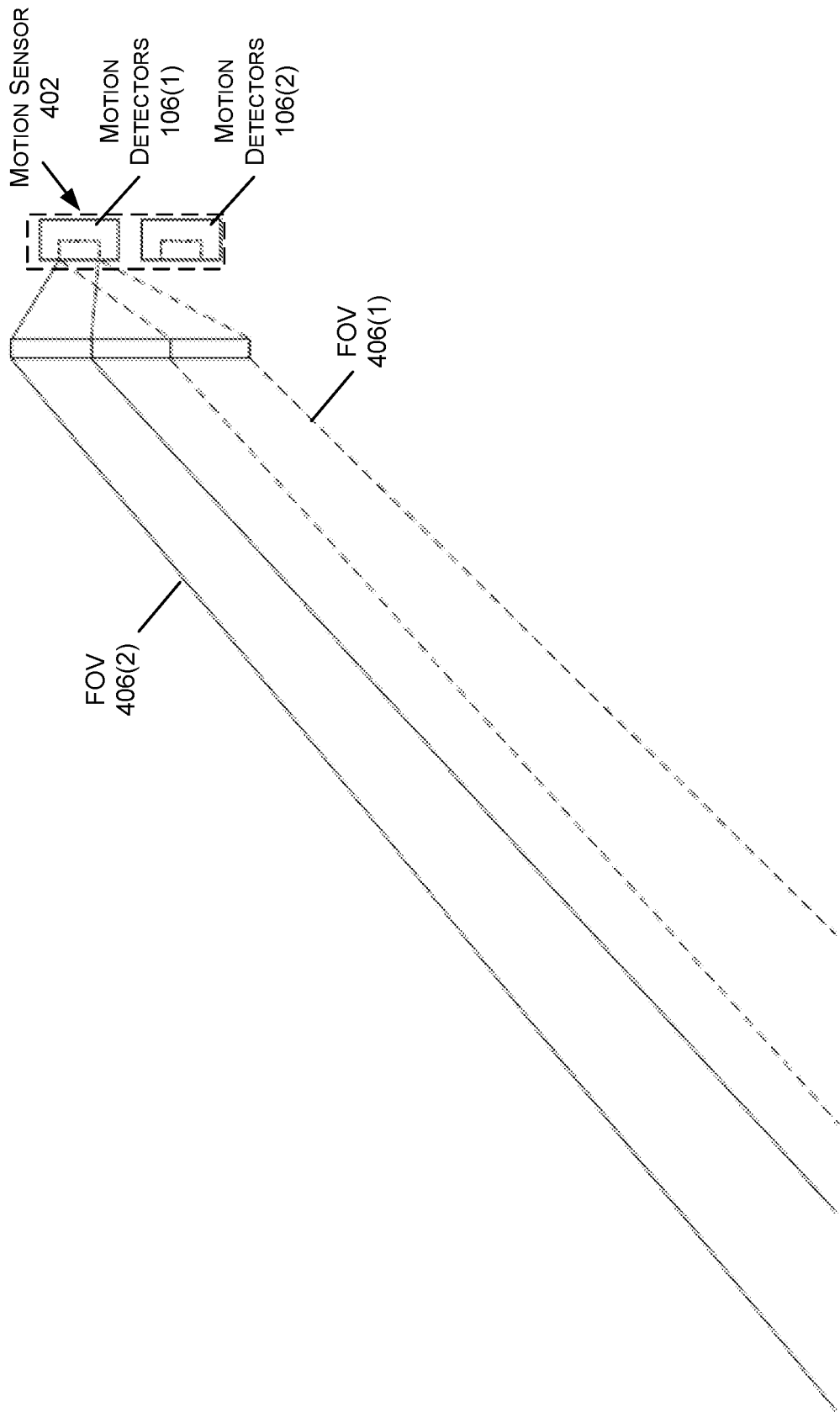
FIGS. 4A-B illustrate use of a component to block a portion of a field of view of a motion sensor.
Figure 4B:
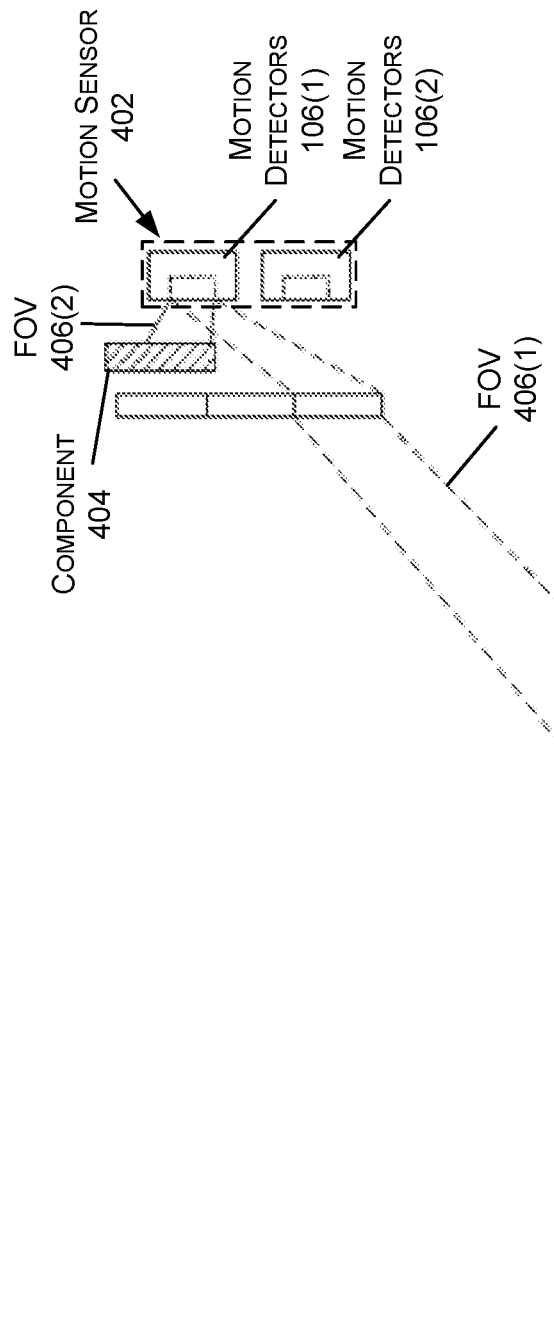

FIG. 3C illustrates an example of the electronic device 104 including non-overlapping fields-of-view 316 and blockers for passive infrared sensors 106, such as when the electronic device 104 again includes a video doorbell, in accordance with examples of the present disclosure. In the example of FIG. 3C, the first passive infrared sensor 106(1) includes first FOVs 316(1)-(3), such as, for example, a first FOV 316(1), a second FOV 316(2), and/or a third FOV 316(3), that are represented by regions 318(1)-(3) (e.g., the light-grey regions). In the example of FIG. 3A, the electronic device 104 may include three separate lenses for the first passive infrared sensor 106(1) in order to provide the three different first FOVs 316(1)-(3) for the first passive infrared sensor 106(1). Additionally, the second passive infrared sensor 106(2) may include a fourth FOV 316(4) that is represented a fourth region 318(4) (e.g., the dark-grey region). In some examples, the electronic device 104 may include a component (which is illustrated in FIG. 4B) that blocks a portion of the fourth FOV 316(4) in order to cause the fourth FOV 316(4) to be smaller as compared to the second FOV 308(2) for the second detector 106 as represented by the example of FIG. 3B.

By including the configuration of FIG. 3C, the electronic device 104 is able to more accurately determine distances of objects that are a greater distance from the electronic device 104 as compared to the configurations in the example of FIG. 3B. For instance, and as shown, when the user 110 is located at a first, further location 320(1) from the electronic device 104, the second passive infrared sensor 106(2) is able to detect the user 110 while first second motion sensor 106 may not detect the user 110. As such, the electronic device 104 may determine that the user 110 is at least a distance 322 from the electronic device 104. To make this determination, the electronic device 104 may determine that the second value 116(2) associated with the second passive infrared sensor 106(2) is large while the first value 116(1) associated with the first passive infrared sensor 106(1) is small (e.g., the electronic device 104 may use a minimum threshold for the first value 116(1)). As such, the electronic device 104 may determine that the ratio 124 is also large. Because of this, the electronic device 104 may determine that the user 110 is at least the distance 322 from the electronic device.

As shown, the distance 322 from the example of FIG. 3C is larger than the distance 314 from the example of FIG. 3B. This is because the first FOVs 316(1)-(3) of the first passive infrared sensor 106(1) in the example of FIG. 3C extend a greater distance from the electronic device 104 than the first FOV 308(1) of the electronic device 104 from the example of FIG. 3B. As such, the electronic device 104 may determine that the user 110 is a further distance 322 from the electronic device 104 when only the second detector 106 detects the user 110.

Additionally, when the user 110 is located at a second, closer location 320(2) from the electronic device 104, both the first passive infrared sensor 106(1) and the second passive infrared sensor 106(2) may detect the user 110. As such, the electronic device 104 may determine a distance to the user 110 that is less than the distance 322. For example, the electronic device 104 may determine the first value 116(1) associated with the first passive infrared sensor 106(1) and the second value 116(2) associated with the second passive infrared sensor 106(2), using one or more of the processes described herein. The electronic device 104 may then determine the ratio 124 using the first value 116(1) and the second value 116(2). In the example of FIG. 3C, the closer the user 110 is to the electronic device 104, the smaller the ratio 124 (e.g., the first value 116(1) increases the closer the user 110 is to the electronic device 104 while the second value 116(2) decreases), and the further the user 110 is from the electronic device 104, the larger the ratio 124 (e.g., the second value 116(2) increases the closer the user 110 is to the electronic device 104 while the first value 116(1) decreases). As such, the electronic device 104 may again use one or more of the processes described herein to determine the distance to the user 110 at the second location 320(2).

While the example of FIG. 3C describes the electronic device 106 as including multiple lenses for the first passive infrared sensor 106(1) in order to create the different first FOVs 316(1)-(3), in other examples, the electronic device 104 may additionally, or alternatively, include more than two passive infrared sensors 106 to create the first FOVs 316(1)-(3). For example, the electronic device 104 may include the first passive infrared sensor 106(1) that includes the first FOV 316(1), the second passive infrared sensor 106(2) that includes the fourth FOV 316(4), a third passive infrared sensor 106 that includes the second FOV 316(2), and/or a fourth passive infrared sensor 106 that includes the third FOV 316(3).

As described above, in the example of FIG. 3C, the electronic device 104 may include a component that blocks a portion of the fourth FOV 316(4) of the second passive infrared sensor 106(2). As such, FIGS. 4A-B illustrate an example of a motion sensor 402 that includes a component 404 for blocking a portion of a field of view 316, in accordance with examples of the present disclosure. As shown, the motion sensor 402 includes a first passive infrared sensor 106(1) and a second passive infrared sensor 106(2). In the example of FIG. 4A, the first passive infrared sensor 106(1) may have a first FOV 406(1), where the first FOV 406(1) is represented by dashed lines, and a second FOV 406(2), where the second FOV 406(2) is represented by solid lines. In the example of FIG. 4B, the motion sensor 402 includes a component 404 (shaded) that is blocking the second FOV 406(2).

The component 404 may include, but is not limited to, plastic, cloth, wood, paper, leather, natural textiles, synthetic textiles, metal, and/or any other type of material. Additionally, while the example of FIG. 4B illustrates the component 404 as including a rectangular shape, in other examples, the component may include any other type of shape. For example, the component 404 may include a square shape, a circular shape, a triangular shape, and/or the like. The component 404 may be placed within the motion sensor 402 in order to block one or more FOVs 406, or a specific amount of one or more FOVs 406. As such, the motion sensor 402 may be configured to block a specific amount of an FOV 406 that is based on how the electronic device is utilized. For example, and based on the examples herein, the electronic device may be configured such that the component 404 blocks an increasing number of FOVs 406 or a greater portion of an FOV 406 the closer the electronic device is placed to the ground. Use and positioning of a component 404 to selectively block one or more FOVs 406 or a portion of one or more FOVs 406 may be based on based on calculations or experiments for manipulating a ratio to make it easier to differentiate between persons at difference distances (e.g. make the ratio to distance relationship more linear or more predictable).

In accordance with one or more preferred implementations, output from a first passive infrared sensor 106(1) may be weighted (e.g. multiplied by two, three, etc. or divided by two, three, etc.) with respect to output from a second passive infrared sensor 106(2) to manipulate ratios of output signal or data values (e.g. output voltage values). Such weighting may be determined based on calculations or experiments for manipulating a ratio to make it easier to differentiate between persons at difference distances (e.g. make the ratio to distance relationship more linear or more predictable).

Figure 5:
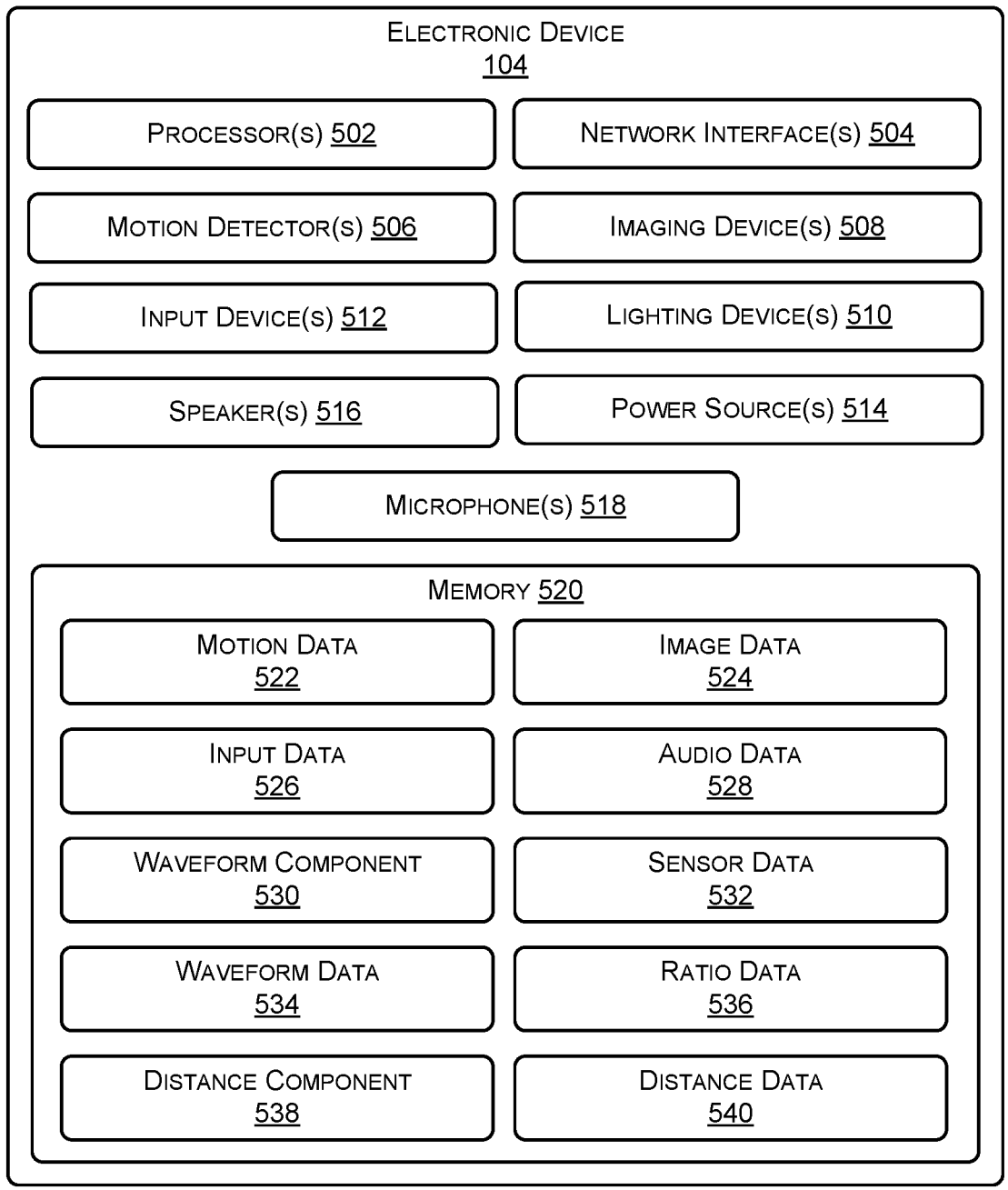
FIG. 5 illustrates an example architecture of an electronic device, in accordance with examples of the present disclosure.

FIG. 5 illustrates an example architecture of the electronic device 104. As shown, the electronic device 104 may include one or more processors 502, one or more network interfaces 504, one or more passive infrared sensors 506 (which may represent, and/or include, the passive infrared sensors 106(1)-(2)), one or more imaging devices 508, one or more lighting devices 510, one or more input devices 512, one or more power sources 514, one or more speakers 516, one or more microphones 518, and memory 520.

The passive infrared sensor(s) 506 may be any type of sensor capable of detecting and communicating the presence of an object within their field of view. As such, the passive infrared sensor(s) 506 may include one or more (alone or in combination) different types of passive infrared sensors. For example, in some embodiments, the passive infrared sensor(s) 506 may comprise passive infrared (PIR) sensors, which may be secured on or within a PIR sensor holder that may reside behind a lens (e.g., a Fresnel lens). In such an example, the PIR sensors may detect IR radiation in a field of view and produce an output signal (typically a voltage) that changes as the amount of IR radiation in the field of view changes. The amount of voltage in the output signal may be compared, by the processor(s) 502, for example, to one or more threshold voltage values to determine if the amount of voltage in the output signal is indicative of motion, and/or if the amount of voltage in the output signal is indicative of motion of an object that is to be captured by the imaging device(s) 508. The processor(s) 502 may then generate motion data 522 representing the motion detected by the passive infrared sensor(s) 506 and/or the distance to the object detected by the passive infrared sensor(s) 506. In some examples, the processor(s) 502 may determine the distance using one or more of the processes described herein.

As described herein, in some examples, the passive infrared sensors 506 may include, but are not limited to, active infrared sensors, passive infrared sensors, and/or any other type of infrared sensors. As described herein, an active infrared sensor may be configured to emit infrared radiation and then detect the emitted infrared radiation. As such, the active infrared sensor may include at least two parts, a light source (e.g., a light-emitting diode) and a receiver. During operation, when an object comes within proximity to the active infrared sensor, the infrared light that is emitted by the light source is reflected off of the object and detected by the receiver. The electronic device 104 is then able to analyze sensor data that is output by the active infrared sensor in order to detect the presence of the object.

A passive infrared sensor may be configured to detect infrared light without emitting the infrared light using a light source. As such, the passive infrared sensor may include two strips of pyroelectric material, an infrared sensor, a lens (e.g., a Fresnel lens), and a housing. The infrared sensor may be configured to block wavelengths of light other than the wavelengths of infrared light. Additionally, the lens may be configured to collect infrared light from many angles and then direct that light to a single point, such as towards the pyroelectric material. As such, when an object moves within proximity to the passive infrared sensor, the object generates infrared light that is captured by the passive infrared sensor. The difference in the infrared levels between the two pyroelectric elements is then measured. As described herein, the electronic device 104 may then analyze sensor data that is output by the passive infrared sensor in order to detect the presence of the object.

Although the above discussion of the motion sensor(s) 506 primarily relates to PIR sensors, depending on the embodiment, the motion sensor(s) 506 may include additional and/or alternate sensor types that produce output signals including alternative data types. For example, and without limitation, the output signal may include an amount of voltage change based at least in part on the presence of infrared radiation in a field of view of an active infrared (AIR) sensor, the output signal may include phase shift data from a microwave-type motion sensor, the output signal may include doppler shift data from an ultrasonic-type motion sensor, the output signal may include radio wave disturbance from a tomographic-type motion sensor, and/or the output signal may include other data types for other sensor types that may be used as the motion sensor(s) 506.

An imaging device 508 may include any device that includes an image sensor, such as a camera, that is capable of generating image data 524 (which may represent, and/or include, the image data 524), representing one or more images (e.g., a video). The image sensor may include a video recording sensor and/or a camera chip. In one aspect of the present disclosure, the imager sensor may comprise a complementary metal-oxide semiconductor (CMOS) array and may be capable of recording high definition (e.g., 722$p$, 1800$p$, 4K, 8K, etc.) video files. The imaging device 508 may include a separate camera processor, or the processor(s) 502 may perform the camera processing functionality. The processor(s) 502 (and/or camera processor) may include an encoding and compression chip. In some embodiments, the processor(s) 502 (and/or the camera processor) may comprise a bridge processor. The processor(s) 502 (and/or the camera processor) may process video recorded by the image sensor and may transform this data into a form suitable for transfer by the network interface(s) 504. In various examples, the imaging device 508 also includes memory, such as volatile memory that may be used when data is being buffered or encoded by the processor(s) 502 (and/or the camera processor). For example, in certain embodiments the camera memory may comprise synchronous dynamic random-access memory (SD RAM).

The lighting device(s) 510 may be one or more light-emitting diodes capable of producing visible light when supplied with power (e.g., to enable night vision). In some embodiments, when activated, the lighting device(s) 510 illuminates a light pipe. In some examples, the electronic device 104 uses the lighting device(s) 510 to illuminate specific components of the electronic device 104, such as the input device(s) 512. This way, users are able to easily see the components when proximate to the electronic device 104.

An input device 512 may include, but is not limited to, a button, a touch-sensitive surface, a switch, a slider, and/or any other type of device that allows a user to provide input to the electronic device 104. For example, if the electronic device 104 includes a doorbell, then the input device 512 may include a doorbell button. In some examples, based on receiving an input, the processor(s) 502 may receive a signal from the input device 512 and use the signal to determine that the input device 512 received the input. Additionally, the processor(s) 502 may generate input data 526 representing the input received by the input device(s) 512. For example, the input data 526 may represent the type of input (e.g., a push to a button), a time that the input occurred, and/or the like.

The power source(s) 514 may include one or more batteries that provide power to the electronic device 104. However, in other examples, the electronic device 104 may not include the power source(s) 514. In such examples, the electronic device 104 may be powered using a source of external AC (alternating-current) power, such as a household AC power supply (alternatively referred to herein as "AC mains" or "wall power"). The AC power may have a voltage in the range of 112-220 VAC, for example. The incoming AC power may be received by an AC/DC adapter (not shown), which may convert the incoming AC power to DC (direct-current) and may step down the voltage from 112-220 VAC to a lower output voltage of about 12 VDC and an output current of about 2 A, for example. In various embodiments, the output of the AC/DC adapter is in a range from about 5 V to about 15 V and in a range from about 0.5 A to about 5 A. These voltages and currents are examples provided for illustration and are not intended to be limiting.

The speaker(s) 516 may be any electromechanical device capable of producing sound in response to an electrical signal input. The microphone(s) 518 may be an acoustic-to-electric transducer or sensor capable of converting sound waves into audio data 528 representing the sound. The speaker(s) 516 and/or microphone(s) 518 may be coupled to an audio CODEC to enable digital audio received by user devices to be decompressed and output by the speaker(s) 516 and/or to enable audio data captured by the microphone(s) 518 to be compressed into digital audio data 528. The digital audio data 528 may be received from and sent to user devices using one or more remote systems. In some examples, the electronic device 104 includes the speaker(s) 516 and/or the microphone(s) 518 so that the user associated with the electronic device 104 can communicate with one or more other users located proximate to the electronic device 104. For example, the microphone(s) 518 may be used to generate audio data representing the speech of the one or more other users, which is then sent to the user device. Additionally, the speaker(s) 516 may be configured to output user speech of the user, where the user's user speech may also be represented by audio data 528.

As further illustrated in the example of FIG. 5, the electronic device 104 may store a waveform component 530. The waveform component 530 may be configured to analyze sensor data 532 generated and then output by the passive infrared sensor(s) 506. Based on the analysis, the waveform component 530 may be configured to generate waveform data 534 including the waveform represented by the sensor data 532, where waveforms are illustrated with respect to FIG. 6. In some examples, the waveform component 530 may generate the waveform data 534 based on the sensor data 532 generated by the passive infrared sensors 506. For example, the waveform component 530 may determine a first voltage associated with the first sensor data 532 and second voltage associated with the second sensor data 532. For another example, the waveform component 530 may determine a first current associated with the first sensor data 532 and a second current associated with the second sensor data 532. The waveform component 530 may utilize the voltages and/or currents associated with the sensor data 532 to determine the waveforms represented by the waveform data 534.

Additionally, the waveform component 530 may be configured to analyze the waveform data 534 to determine ratio data 536 including a ratio between values associated with waveforms, such as, for example, a first waveform associated with a first passive infrared sensor 506 of the electronic device 104 and a second waveform associated with a second passive infrared sensor 506 of the electronic device 104. For example, the waveform component 530 may determine a first value associated with first sensor data and a second value associated with the second sensor data. For instance, a first signal represented by the first sensor data 532 may include the first waveform and a second signal represented by the second sensor data 532 may include the second waveform. As such, the waveform component 530 may analyze the first waveform to determine a first value. In some examples, the first value may include a first amplitude of the first waveform, a first angle of the first waveform, and/or any other characteristic associated with the first waveform. The waveform component 530 may also analyze the second waveform to determine a second value. In some examples, the second value may include a second amplitude of the second waveform, a second angle of the second waveform, and/or any other characteristic associated with the second waveform.

The waveform component 530 may determine the first value and/or the second value using additional and/or alternative techniques. For example, the waveform component 530 may determine the first value as a first voltage associated with the first sensor data and the second value as a second voltage associated with the second sensor data. For another example, the waveform component 530 may determine the first value as a first current associated with the first sensor data 532 and the second value as a second current associated with the second sensor data 532.

The waveform component 530 may determine a ratio of the second value to the first value. In some examples, the ratio 124 is smaller the closer the user 110 is to the electronic device 104. This is because the closer the user is to the electronic device 104, the larger the first value and the smaller the second value (e.g., the first passive infrared sensor 506 detects a greater portion of the user than the second passive infrared sensor 506, as described herein). Additionally, the ratio is larger the further the user is from the electronic device 104. This is because the further the user is from the electronic device 104, the larger the second value and the smaller the first value (e.g., the second passive infrared sensor 506 detects a greater portion of the user than the first passive infrared sensor 506, as described herein).

While the waveform component 530 may determine the ratio data 536 representing the ratio based on the second value and the first value, in other examples, the waveform component 530 may use the first value and the second value to determine a final value other than the ratio. For example, the waveform component 530 may determine a final value by multiplying the first value times the second value, averaging the first value and the second value, subtracting the first value by the second value or the second value by the first value, adding the first value and the second value, and/or using one or more additional and/or alternative equations.

Additionally, as illustrated in the example of FIG. 5, the electronic device 104 may store a distance component 538. The distance component 538 may determine a distance from the electronic device 104 to a user in a field of view associated with the passive infrared sensor(s) 506 based on a ratio determined by the waveform component 530. In some examples, to determine the distance, the electronic device 104 may store distance data 540 that associates various ratios with various distances, where associated ratios and distances are illustrated with respect to FIG. 7. For example, the data may associate a first ratio with a first distance to an object, a second ratio with a second distance to an object, a third ratio with a third distance to an object, and/or so forth. In such examples, the electronic device 104 may use the distance data 540 to determine that the ratio is associated with the distance. As such, the electronic device 104 may determine that the user is the distance from the electronic device 104.

Additionally, or alternatively, in some examples, the electronic device 104 may use one or more equations to determine the distance using the ratio data 536. For example, the electronic device 104 may use a linear equation, a radical equation, an exponential equation, and/or any other type of equation that is configured to determine distances to objects based on the ratios. In such examples, the electronic device 104 may input the ratio into the equation in order to determine the distance. As such, the electronic device 104 may determine that the user is the distance from the electronic device 104 based on an output from the equation(s).

In some examples, the electronic device 104 may continue to perform the processes described herein in order to continue determining the distances that the user is from the electronic device 104. The electronic device 104 may then use the distances to perform one or more processes. For a first example, the electronic device 104 may use the distances to determine a direction of motion associated with the user. For instance, if the distances are decreasing, then the electronic device 104 may determine that the user is moving towards the electronic device 104. However, if the distances are increasing, then the electronic device 104 may determine that the user is moving away from the electronic device 104.

For a second example, the electronic device 104 may determine whether to generate a motion alert and/or generate image data using the distance(s). For instance, in some examples, the electronic device 104 may determine to generate a motion alert and/or generate image data based on the user being within a threshold distance to the electronic device 104. As such, the electronic device 104 may compare the distance to the threshold distance. If the distance satisfies (e.g., is less than or equal to) the threshold distance, then the electronic device 104 may generate the motion alert and/or the image data. However, if the distance does not satisfy (e.g., is greater than) the threshold distance, then the electronic device 104 may refrain from generating the motion alert and/or image data.

Figure 6:
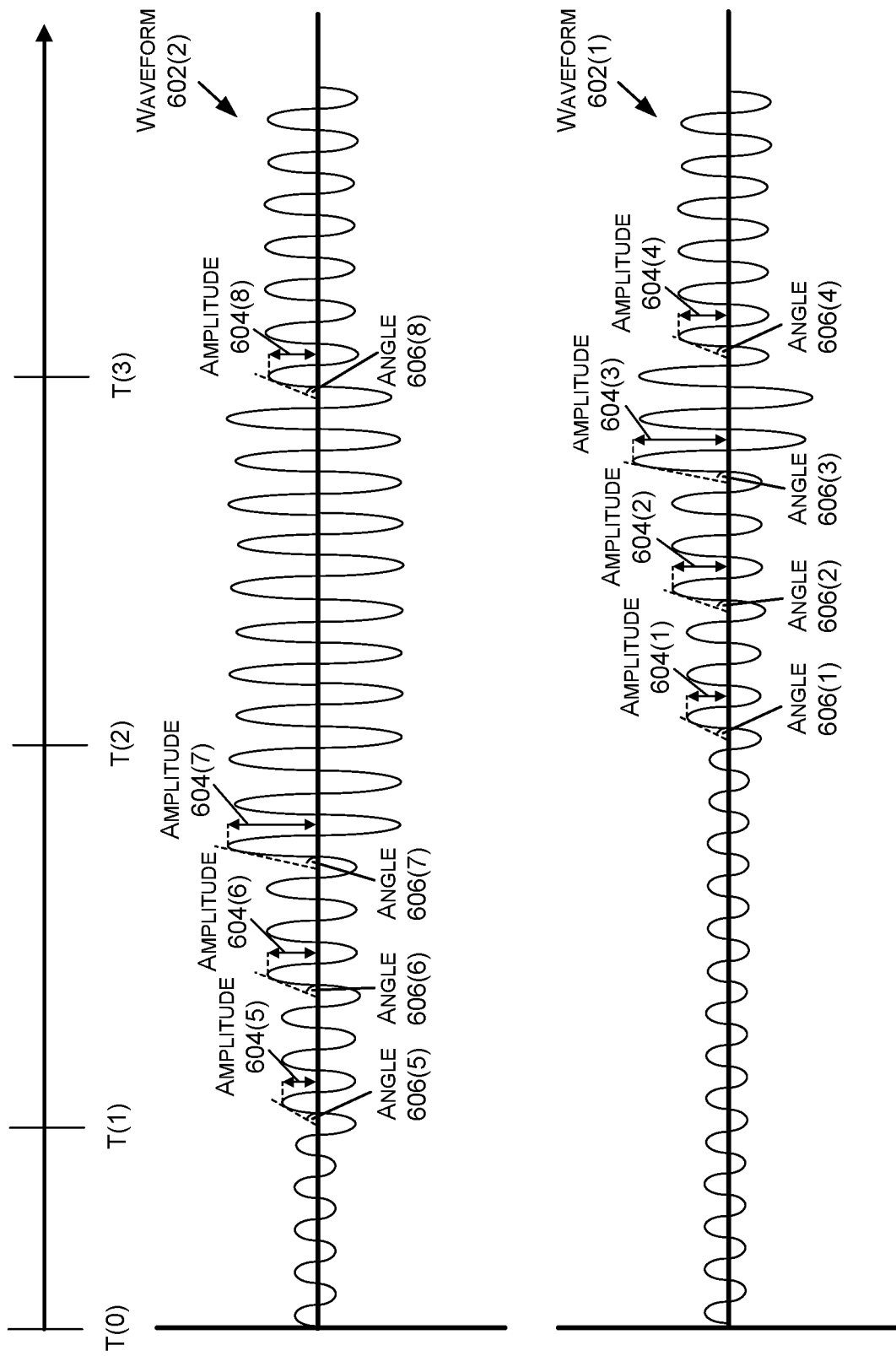
FIG. 6 illustrates an example of a first waveform and a second waveform that may be generated by a motion sensor based on sensor data.

FIG. 6 illustrates an example of a first waveform 602(1) and a second waveform 602(2) that may be generated by a motion sensor based on sensor data. In the example of FIG. 6, the first waveform 602(1) may correspond to a first signal associated with sensor data captured by a first passive infrared sensor of a motion sensor and/or the second waveform 602(2) may correspond to a second signal associated with sensor data captured by a second passive infrared sensor of the motion sensor. In some examples, the first waveform 602(1) may correspond to the first waveform 114(1) associated with the first passive infrared sensor 106(1) having the first FOV 108(1) that is configured the closer distance to the electronic device 104, as described with respect to FIG. 1. Additionally, the second waveform 602(2) may correspond to the second waveform 114(2) associated with the second passive infrared sensor 106(2) having the second FOV 108(2) that is configured the further distance to the electronic device 104, as described with respect to FIG. 1.

Figure 7:
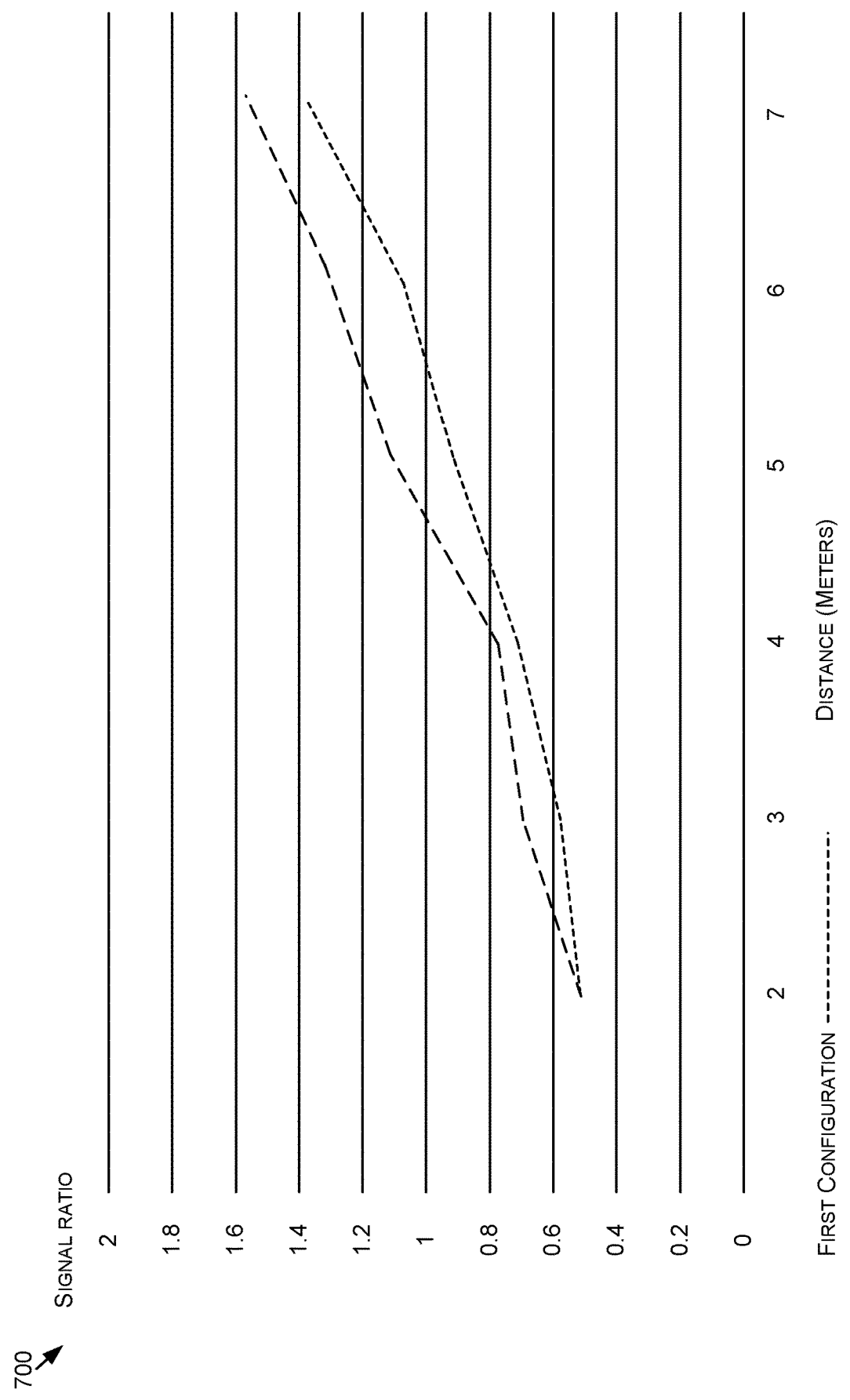
FIG. 7 illustrates an example correlation between a signal ratio determined by an electronic device and a distance to an object that is detected.

As described herein, the electronic device 104 may analyze the first waveform 602(1) to determine a first value. As illustrated by FIG. 7, the first value may include one or more first amplitudes 604(1)-(4) of the first waveform 602(1), one or more first angles 606(1)-(4) of the first waveform 602(1), and/or any other characteristic associated with the first waveform 602(1). The electronic device 104 may also analyze the second waveform 602(2) to determine a second value. As described herein, the second value may include one or more second amplitudes 604(5)-(8) of the second waveform 602(2), one or more second angles 606(5)-(8) of the second waveform 602(2), and/or any other characteristic associated with the second waveform 602(2).

As described with respect to FIG. 1, the electronic device 104 may determine a ratio of the second value to the first value. For instance, the electronic device 104 may determine a ratio between the second value and the first value. In some examples, the ratio is smaller the closer the user is to the electronic device 104. This is because the closer the user is to the electronic device 104, the larger the first value and the smaller the second value (e.g., the first passive infrared sensor detects a greater portion of the user than the second passive infrared sensor). Additionally, the ratio is larger the further the user is from the electronic device 104. This is because the further the user is from the electronic device 104, the larger the second value and the smaller the first value (e.g., the second passive infrared sensor detects a greater portion of the user than the first passive infrared sensor).

In some configurations, the second passive infrared sensor associated with the second waveform 602(2) may detect a user prior to the first passive infrared sensor associated with the first waveform 602(1). As illustrated by FIG. 7, the second amplitudes 604(5)-(8) associated with the second waveform 602(2) may indicate detection of user at an earlier time than the first amplitudes 604(1)-(4) associated with the first waveform 602(1). For instance, prior to the time T1, both the first waveform 602(1) and the second waveform 602(2) may remain at a constant, unchanged amplitude. Around the time T1, the second waveform 602(2) may change in amplitude as represented by the fifth amplitude 604(5). As the time progresses from time T1 to T2, the second waveform 602(2) may continue to change while the first waveform 602(1) remains unchanged, thus indicating that a user is at a position associated with a region included in the second FOV, such as, for example, the location 212(2) included in the region 210(2) as illustrated in FIG. 2B. Additionally, the electronic device 104 may determine that the user is approaching the electronic device 104 based on the amplitudes 604 associated with the waveforms 602, in accordance with the techniques described herein. For example, and as illustrated, the sixth amplitude 604(6) is greater than the fifth amplitude 604(5) and the seventh amplitude 604(7) is greater than both the fifth amplitude 604(5) and the sixth amplitude 604(6). From the time associated with the seventh amplitude 604(7) and until around the time T3, the amplitude 604 of the second waveform 602(2) remains substantially constant, indicating that the user remains in the second FOV associated with the second passive infrared sensor. Around the time T3, the second waveform 602(2) again changes, this time decreasing in amplitude, as shown by the eighth amplitude 604(8), indicating that the user is at a position associated with an overlap region between the first FOV and the second FOV, such as, for example, the location 206(2) included in the region 204(2) as illustrated in FIG. 2A. In additional configurations where the FOVs do not overlap, the user may be at a position associated with a first region associated with the first FOV and a second region associated with the second FOV, such as, for example, the location 212(3) included in the regions 210(1) and 210(2) as illustrated in FIG. 2B.

Additionally, around the time T2, the first waveform 602(1) may begin to change. The change in the first waveform 602(1) may begin around the time T2, while the change in the second waveform 602(2) may begin around the time T1, based on the first passive infrared sensor associated with the first waveform 602(1) having the first FOV configured closer to the electronic device than the second FOV associated with the second passive infrared sensor. From the time T2 to T3, the first waveform 602(1) may continue to change, such as by the first amplitudes 604(1)-(3) increasing over this time period. Additionally, the amplitudes 604 of the first waveform 602(1) and the second waveform 602(2) between the time period T2 and T3 may indicate that the user in at a position associated with an overlap region between the first FOV and the second FOV, such as, for example, the location 206(2) included in the region 204(2) as illustrated in FIG. 2A. In additional configurations where the FOVs do not overlap, the user may be at a position associated with a first region associated with the first FOV and a second region associated with the second FOV, such as, for example, the location 212(3) included in the regions 210(1) and 210(2) as illustrated in FIG. 2B. Around the time T3, the first waveform 602(1) again changes, this time decreasing in amplitude, as shown by the fourth amplitude 604(4), indicating that the user is at a position associated with a region associated with the first FOV of the first passive infrared sensor, such as, for example, the location 206(1) included in the region 204(1) as illustrated in FIG. 2A.

As discussed herein, the electronic device 104 may determine a ratio between a first value associated with the first waveform 602(1) and a second value associated with the second waveform 602(2) at a given point in time. The ratio may then be utilized by the electronic device 104 to determine a distance of the user to the electronic device 104. Examples of correlations between a ratio and a distance of the user to the electronic device 104 is illustrated by FIG. 7. FIG. 7 illustrates example correlations between a signal ratio determined by an electronic device 104 and a distance to an object that is detected, based on various configurations of the electronic device 104. A first configuration, represented by the line with short dashes, may correspond to a doorbell camera configuration and a second configuration, represented by the line having the longer dashes, may correspond to a security camera configuration as described herein.

As previously described, different variations of the passive infrared sensors are able to detect objects when the objects are located close to the electronic device 104 (e.g., within two meters) and when the objects are located far from the electronic device 104 (e.g., further than six meters). For example, when the user is located at a first, closer location from the electronic device 104, the first passive infrared sensor is able to detect the user 110 while the second passive infrared sensor may not detect the user. As such, the electronic device 104 may determine that the user is within a first distance from the electronic device 104. To make this determination, the electronic device 104 may determine that a first value associated with the first passive infrared sensor is large while a second value associated with the second passive infrared sensor is zero or small. As such, the electronic device 104 may determine that the ratio is also small. Because of this, the electronic device 104 may determine that the user is within the first distance. Such a correlation is represented by FIG. 7, where at a distance of 2 meters, the ratio is approximately 0.5 for both the first configuration and the second configuration of the electronic device 104.

Additionally, when the user is located at a second, further location from the electronic device 104, the second passive infrared sensor is able to detect the user while the first motion sensor may not be able to detect the user. As such, the electronic device 104 may determine that the user further than a second distance from the electronic device 104. To make this determination, the electronic device 104 may determine that the first value associated with the first passive infrared sensor is small (e.g., the electronic device 104 may use a minimum threshold for the first value) and the second value for the second passive infrared sensor is large. As such, the electronic device 104 may determine that the ratio is also large. Because of this, the electronic device 104 may determine that the user is the second distance from the electronic device 106. Such a correlation is represented by FIG. 7, where at a distance of 7 meters, the ratio is approximately 1.4 for the first configuration of the electronic device 104 and approximately 1.6 for the second configuration of the electronic device 104.

Furthermore, when the user is located at a third location from the electronic device 104, the first passive infrared sensor and the second passive infrared sensor are both able to detect the user. As such, the electronic device 104 may determine a distance to the user that is between the first distance and the second distance. To make this determination, the electronic device 104 may determine the first value associated with the first passive infrared sensor, where the first value will depend on the location of the user between the first location and the second location, and the second value associated with the second passive infrared sensor, where the second value will also depend on the location of the user between the first location and the second location. The electronic device 104 may then perform the processes described herein to determine the ratio and use the ratio to determine the distance to the user. A correlation between such a distance and ratio is represented by FIG. 7, where at a distance of 5 meters, the ratio is approximately 0.9 for the first configuration of the electronic device 104 and approximately 1.1 for the second configuration of the electronic device 104.

Figure 8:
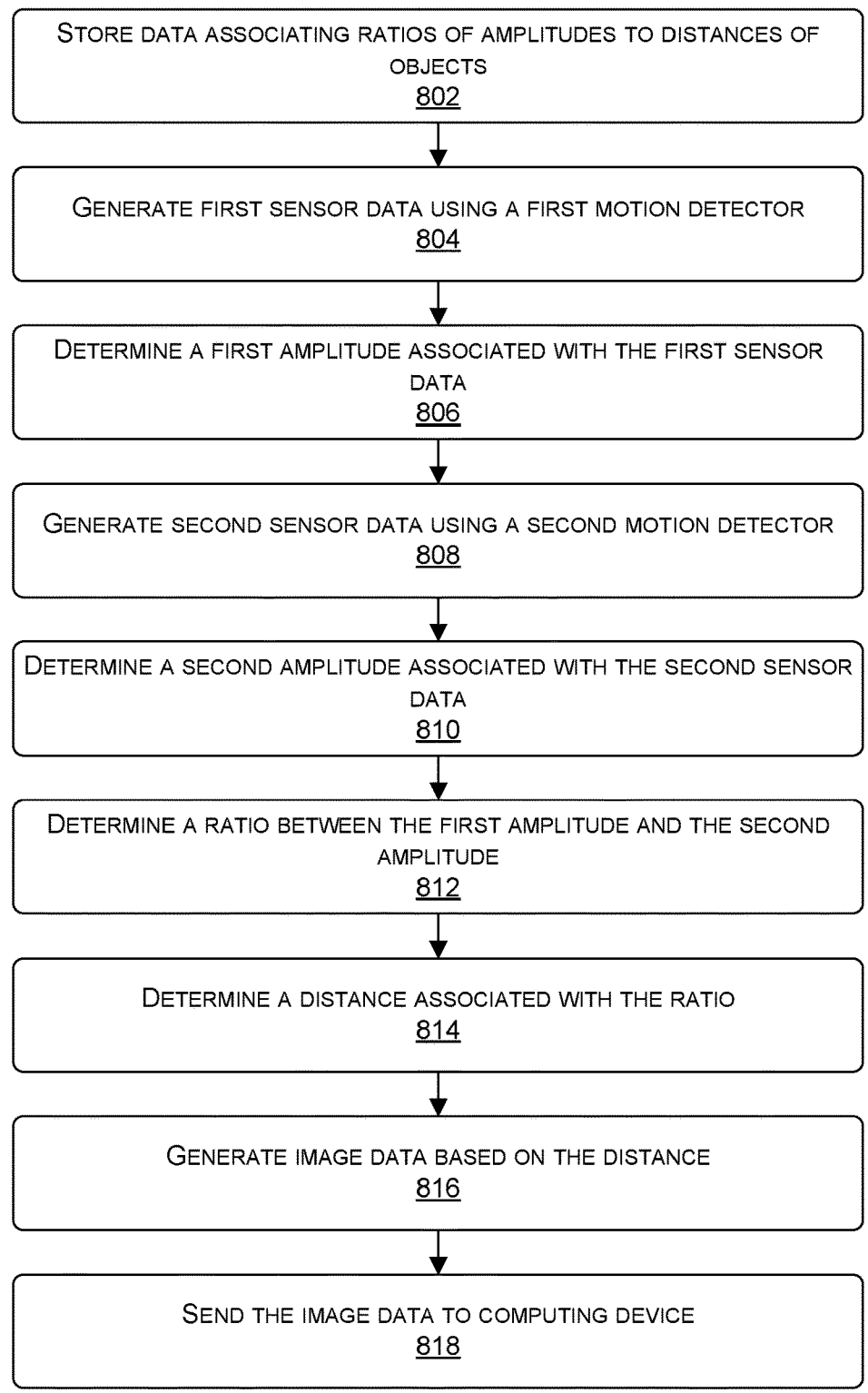
FIG. 8 illustrates a flow diagram of an example process for using multiple passive infrared sensors to determine a distance to an object, in accordance with examples of the present disclosure.
Figure 9:
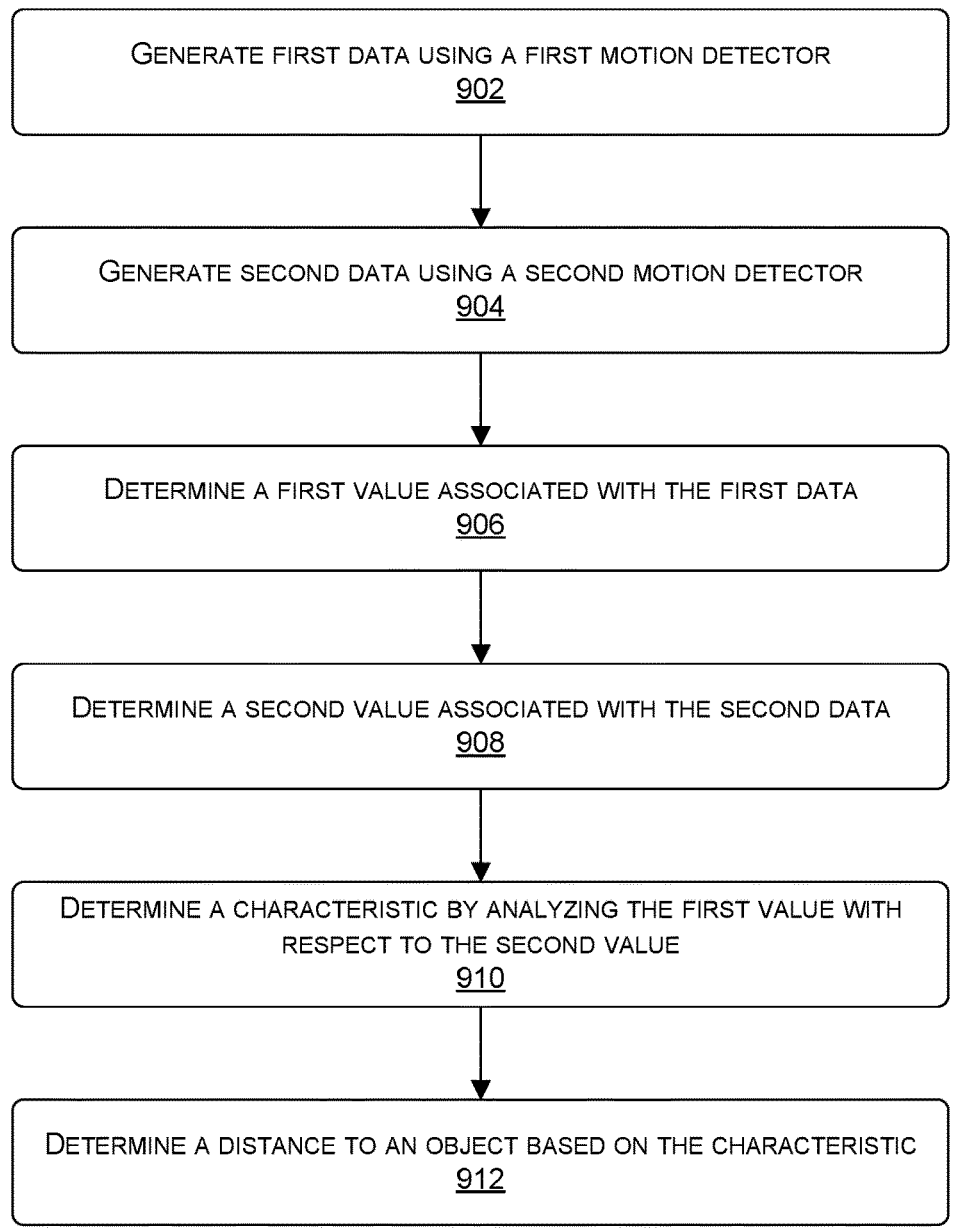
FIG. 9 illustrates a flow diagram another example process for using multiple passive infrared sensors to determine a distance to an object, in accordance with examples of the present disclosure.

FIGS. 8 and 9 are flowcharts illustrating example processes 800 and 900 for using multiple passive infrared sensors to determine a distance to an object, in accordance with examples of the present disclosure. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed.

FIG. 8 is a flowchart illustrating an example process 800 for using multiple passive infrared sensors to determine a distance to an object. In some examples, the passive infrared sensors may be included in an electronic device. At 802, the process 800 may include storing data associating ratios of amplitudes to distances of objects. For instance, the data may associate a first ratio with a first distance to an object, a second ratio with a second distance to an object, a third ratio with a third distance to an object, and/or so forth. At 804, the process 800 may include generating first sensor data using a first passive infrared sensor. In some examples, an electronic device may include both a first passive infrared sensor and a second passive infrared sensor. The first passive infrared sensor may include a first FOV that extends a first distance from the electronic device to capture the first sensor data. In some examples, the first FOV is created using a first orientation of the first passive infrared sensor and/or one or more first lenses associated with the first passive infrared sensor. As discussed herein, when a user enters the first FOV, the electronic device may detect the presence of the user using the first passive infrared sensor and generate the first sensor data. At 806, the process 800 may include determining a first amplitude associated with the first sensor data. For instance, a first signal represented by the first sensor data may include a first waveform. The electronic device may analyze the first waveform to determine a first value. In some examples, the first value may include a first amplitude of the first waveform, a first angle of the first waveform, and/or any other characteristic associated with the first waveform.

At 808, the process 800 may include generating second sensor data using a second passive infrared sensor. The second passive infrared sensor may include a second FOV that extends a second, further distance from the electronic device. In some examples, the second FOV is created using a second orientation of the second passive infrared sensor and/or one or more second lenses associated with the second passive infrared sensor. As discussed herein, when a user enters the second FOV, the electronic device may detect the presence of the user using the first passive infrared sensor and generate the second sensor data. At 810, the process 800 may include determining a second amplitude associated with the second sensor data. For instance, a second signal represented by the second sensor data may include a second waveform. The electronic device may analyze the second waveform to determine a second value. In some examples, the second value may include a second amplitude of the second waveform, a second angle of the second waveform, and/or any other characteristic associated with the second waveform.

At 812, the process 800 may include determining a ratio between the first amplitude and the second amplitude. For instance, the electronic device 104 may determine a ratio between the second amplitude (or any second value) and the first amplitude (or any first value). In some examples, the ratio is smaller the closer the user is to the electronic device. This is because the closer the user is to the electronic device, the larger the first value and the smaller the second value (e.g., the first passive infrared sensor detects a greater portion of the user than the second passive infrared sensor). Additionally, the ratio is larger the further the user is from the electronic device. This is because the further the user is from the electronic device, the larger the second value and the smaller the first value (e.g., the second detector detects a greater portion of the user than the first detector).

At 814, the process 800 may include determining a distance associated with the ratio. In some examples, the distance associated with the ratio may be determined based on the stored data associating the ratios of the amplitudes to distances of objects. For instance, the electronic device may determine a distance from the electronic device to the user based on the ratio. As previously described, to determine the distance, the electronic device may store data that associates various ratios with various distances. For example, the data may associate a first ratio with a first distance to an object, a second ratio with a second distance to an object, a third ratio with a third distance to an object, and/or so forth. In such examples, the electronic device may use the data to determine that the ratio is associated with a given distance. As such, the electronic device may determine that the user is the given distance from the electronic device.

At 816, the process 800 may include generating image data based on the distance. For a second example, the electronic device may determine whether to generate a motion alert and/or generate image data using the distance(s). For instance, in some examples, the electronic device may determine to generate a motion alert and/or generate image data based on the user being within a threshold distance to the electronic device. As such, the electronic device may compare the distance to the threshold distance. If the distance satisfies (e.g., is less than or equal to) the threshold distance, then the electronic device may generate the motion alert and/or the image data. However, if the distance does not satisfy (e.g., is greater than) the threshold distance, then the electronic device may refrain from generating the motion alert and/or image data. At 818, the process 800 may include sending the image data to a computing device. For instance, the electronic device may send the image data and/or the motion alert to a computing device associated with a user that owns the electronic device, such as, for example, a mobile computing device.

FIG. 9 is a flowchart illustrating another example process 900 for using multiple passive infrared sensors to determine a distance to an object. In some examples, the passive infrared sensors may be included in an electronic device. At 902, the process 900 may include generating first data using a first passive infrared sensor, and at 904, the process 900 may include generating second data using a second passive infrared sensor. In some examples, an electronic device may include both a first passive infrared sensor and a second passive infrared sensor. The first passive infrared sensor may include a first FOV that extends a first distance from the electronic device to capture the first sensor data. In some examples, the first FOV is created using a first orientation of the first passive infrared sensor and/or one or more first lenses associated with the first passive infrared sensor. As discussed herein, when a user enters the first FOV, the electronic device may detect the presence of the user using the first passive infrared sensor and generate the first sensor data. Additionally, the second passive infrared sensor may include a second FOV that extends a second, further distance from the electronic device. In some examples, the second FOV is created using a second orientation of the second passive infrared sensor and/or one or more second lenses associated with the second passive infrared sensor. As discussed herein, when a user enters the second FOV, the electronic device may detect the presence of the user using the first passive infrared sensor and generate the second sensor data.

At 906, the process 900 may include determining a first value associated with the first data, and at 908, the process 900 may include determining a second value associated with the second data. For instance, a first signal represented by the first sensor data may include a first waveform. The electronic device may analyze the first waveform to determine a first value. In some examples, the first value may include a first amplitude of the first waveform, a first angle of the first waveform, and/or any other characteristic associated with the first waveform. Additionally, a second signal represented by the second sensor data may include a second waveform. The electronic device may analyze the second waveform to determine a second value. In some examples, the second value may include a second amplitude of the second waveform, a second angle of the second waveform, and/or any other characteristic associated with the second waveform.

At 910, the process 900 may include determining a characteristic by analyzing the first value with respect to the second value. In some examples, the characteristic may represent a ratio between the first value and the second value. For instance, the electronic device 104 may determine a ratio between the second value (or any value represented by the second value) and the first value (or any value represented by the first value). In some examples, the ratio is smaller the closer the user is to the electronic device. This is because the closer the user is to the electronic device, the larger the first value and the smaller the second value (e.g., the first passive infrared sensor detects a greater portion of the user than the second passive infrared sensor). Additionally, the ratio is larger the further the user is from the electronic device. This is because the further the user is from the electronic device, the larger the second value and the smaller the first value (e.g., the second detector detects a greater portion of the user than the first detector).

At 912, the process 900 may include determining a distance to an object based on the first characteristic. In some examples, the distance associated with the ratio may be determined based on the stored data associating the ratios of the amplitudes to distances of objects. For instance, the electronic device may determine a distance from the electronic device to the user based on the ratio. In some examples, to determine the distance, the electronic device may store data that associates various ratios with various distances. For example, the data may associate a first ratio with a first distance to an object, a second ratio with a second distance to an object, a third ratio with a third distance to an object, and/or so forth. In such examples, the electronic device may use the data to determine that the ratio is associated with a given distance. As such, the electronic device may determine that the user is the given distance from the electronic device.

Figure 10:
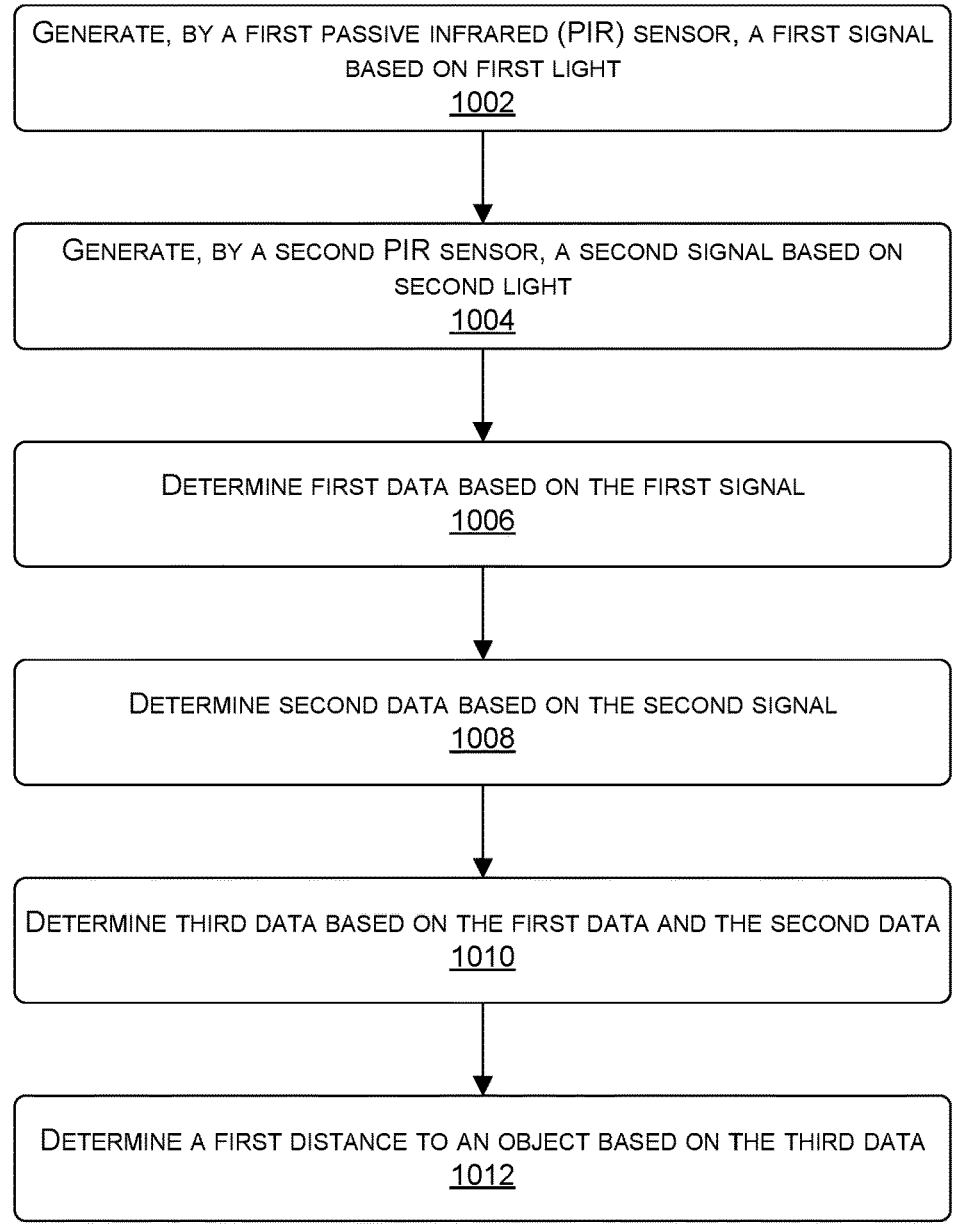
FIG. 10 illustrates a flow diagram another example process for using multiple passive infrared sensors to determine a distance to an object, in accordance with examples of the present disclosure.

FIG. 10 is a flowchart illustrating another example process 1000 for using multiple passive infrared sensors to determine a distance to an object. In some examples, the passive infrared sensors may be included in an electronic device. At 1002, the process 1000 may include generating, by a first passive infrared sensor of an electronic device, a first signal based on light received at the first passive infrared sensor. At 1004, the process 1000 may include generating, by a second passive infrared sensor, a second signal based on light received at the second passive infrared sensor.

At 1006, the process 1000 may include determining first data based on the first signal. At 1008, the process 1000 may include determining second data based on the second signal. At 1010, the process 1000 may include determining, based on the first data and the second data, third data. At 1012, the process 1000 may include determining a first distance to an object based at least in part on the third data. In some instances, the first passive infrared sensor is positioned above the second passive infrared sensor, and the first field of view is vertically aligned with the second field of view. Further, in some instances the first passive infrared sensor, the second passive infrared sensor, and the one or more lenses are positioned such that, when the electronic device is oriented in the first orientation a left side of the first field of view is aligned with a left side of second field of view, and a right side of the first field of view is aligned with a right side of the second field of view. In some instances, the first field of view and the second field of view overlap, while in other instances they might not.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims.

What is claimed is:

1. An electronic device comprising:
   a first passive infrared sensor, the first passive infrared sensor having a first field-of-view (FOV) that extends a first distance from the electronic device;
   a second passive infrared sensor, the second passive infrared sensor having a second FOV that extends a second distance from the electronic device, the second distance being greater than the first distance;
   a camera;
   one or more processors; and
   one or more computer-readable media storing instructions that, when executed by the one or more processors, cause the electronic device to perform operations comprising:
      storing distance data, the distance data associating ratios of amplitudes detected by the first motion sensor and the second motion sensor to distances of objects;
      generating, during a first period of time, first sensor data using the first passive infrared sensor;
      determining a first amplitude associated with the first sensor data;
      generating, during the first period of time, second sensor data using the second passive infrared sensor;
      determining a second amplitude associated with the second sensor data;
      determining a first ratio between the first amplitude and the second amplitude;
      determining, based at least in part on the distance data, that the first ratio is associated with a first distance to an object;
      based at least in part on the first distance, generating image data using the camera, the image data representing the user; and
      sending the image data to one or more computing devices.

2. The electronic device of claim 1, the one or more computer-readable media storing instructions that, when executed by the one or more processors, cause the electronic device to perform operations comprising:
   generating, during a second period of time that is before the first period of time, third sensor data using the first passive infrared sensor;
   determining a third amplitude associated with the third sensor data;
   generating, during the second period of time, fourth sensor data using the second passive infrared sensor;
   determining a fourth amplitude associated with the fourth sensor data;
   determining a second ratio between the third amplitude and the fourth amplitude;
   determining, based at least in part on the distance data, that the second ratio is associated with a second distance to the object; and
   based at least in part on the second distance, refraining from generating the image data during the second period of time.

3. The electronic device of claim 1, the one or more computer-readable media storing instructions that, when executed by the one or more processors, cause the electronic device to perform operations comprising:
   generating, during a second period of time that is before the first period of time, third sensor data using the first passive infrared sensor;
   determining a third amplitude associated with the third sensor data;
   generating, during the second period of time, fourth sensor data using the second passive infrared sensor;
   determining a fourth amplitude associated with the fourth sensor data;
   determining a second ratio between the third amplitude and the fourth amplitude;
   determining, based at least in part on the distance data, that the second ratio is associated with a second distance to the object; and
   determining that the object is moving towards the electronic device based at least in part on the first distance being less than the second distance,
   wherein the generating of the image data is based at least in part on the object moving towards the electronic device.

4. An electronic device comprising:
   a first passive infrared sensor;
   a second passive infrared sensor;
   one or more lenses shaped and positioned to focus light received at the one or more lenses onto the first passive infrared sensor and the second passive infrared sensor, wherein
   the first passive infrared sensor has a first field of view, the second passive infrared sensor has a second field of view;
   one or more processors; and
   one or more computer-readable media storing instructions that, when executed by the one or more processors, cause the electronic device to perform operations comprising:
      generating, by the first passive infrared sensor, a first signal based on light received at the first passive infrared sensor;
      generating, by the second passive infrared sensor, a second signal based on light received at the second passive infrared sensor;
      determining first data based on the first signal;
      determining second data based on the second signal;
      determining, based on the first data and the second data, third data; and
      determining a first distance to an object based at least in part on the third data;
   wherein the first passive infrared sensor, the second passive infrared sensor, and the one or more lenses are positioned such that, when the electronic device is oriented in a first orientation,
      the first passive infrared sensor is positioned above the second passive infrared sensor, and the first field of view is vertically aligned with the second field of view.

5. The electronic device of claim 4, wherein determining the third data comprises determining a ratio of a value represented by the first data to a value represented by the second data.

6. The electronic device of claim 4, wherein the first data represents an amplitude value at a first time for a waveform associated with the first data, and the second data represents an amplitude value at the first time for a waveform associated with the second data.

7. The electronic device of claim 4, wherein the first data represents a slope value at a first time for a waveform associated with the first data, and the second data represents a slope value at the first time for a waveform associated with the second data.

8. The electronic device of claim 4, wherein the first data represents a derivative value at a first time for a waveform associated with the first data, and the second data represents a derivative value at the first time for a waveform associated with the second data.

9. The electronic device of claim 4, wherein the camera has a field of view including a top and a bottom and a left and a right, and wherein the first passive infrared sensor and the second passive infrared sensor are aligned along a first axis parallel to a bottom-to-top axis associated with the field of view of the camera.

10. The electronic device of claim 4, wherein the second passive infrared sensor is positioned axially in line with the first passive infrared sensor along a first axis, and wherein the first passive infrared sensor includes a first sensing element, and a second sensing element positioned axially in line with the first sensing element along a second axis, the second axis being orthogonal to the first axis.

11. The electronic device of claim 10, wherein the second passive infrared sensor includes a third sensing element, and a fourth sensing element positioned axially in line with the third sensing element along a third axis, the third axis being orthogonal to the first axis and parallel to the second axis.

12. The electronic device of claim 4, wherein determining the first data comprises determining a voltage at a point in time.

13. The electronic device of claim 4, wherein determining the first data comprises determining an amplitude at a point in time.

14. The electronic device of claim 4, wherein the one or more lenses are shaped and positioned to focus light received at the one or more lenses onto the first passive infrared sensor and the second passive infrared sensor so as to
cause the first passive infrared sensor to have a first plurality of fields of view, the first plurality of fields of view including the first field of view, and
cause the second passive infrared sensor to have a second plurality of fields of view, the second plurality of fields of view including the second field of view.

15. The electronic device of claim 14, wherein at least one field of view of the first plurality of fields of view overlaps with at least one field of view of the second plurality of fields of view.

16. The electronic device of claim 14, wherein no field of view of the first plurality of fields of view overlaps with any field of view of the second plurality of fields of view.

17. The electronic device of claim 4, wherein the electronic device comprises a mount configured to mount the electronic device in the first orientation.

18. The electronic device of claim 4, wherein the first passive infrared sensor, the second passive infrared sensor, and the one or more lenses are positioned such that, when the electronic device is oriented in the first orientation
a left side of the first field of view is aligned with a left side of second field of view, and
a right side of the first field of view is aligned with a right side of the second field of view.

19. The electronic device of claim 4, wherein the first field of view and the second field of view overlap.

20. The electronic device of claim 4, wherein the first field of view and the second field of view do not overlap.

21. The method of claim 4, wherein the one or more lenses are shaped and positioned to focus infrared radiation received at the one or more lenses onto the first passive infrared sensor and the second passive infrared sensor so as to cause the first passive infrared sensor to have a first plurality of fields of view, the first plurality of fields of view including the first field of view; and
wherein the electronic device includes at least one object blocking infrared radiation received at the one or more lenses from being directed onto the second passive infrared sensor.

22. The method of claim 4, wherein the electronic device is a video doorbell device.

23. The electronic device of claim 4, wherein
the first passive infrared sensor comprises a pair of sensing elements aligned along a first axis;
the second passive infrared sensor comprises a pair of sensing elements aligned along a second axis that is parallel to the first axis; and
the first passive infrared sensor and the second passive infrared sensor are aligned along a third axis that is orthogonal to the first axis and the second axis.

24. The electronic device of claim 4, wherein the electronic device comprises a camera.

25. The electronic device of claim 4, wherein the electronic device is mounted in the first orientation.

26. A method comprising:
generating, by a first passive infrared sensor of an electronic device, a first signal based on light received at the first passive infrared sensor;
generating, by a second passive infrared sensor, a second signal based on light received at the second passive infrared sensor;
determining first data based on the first signal;
determining second data based on the second signal;
determining, based on the first data and the second data, third data; and
determining a first distance to an object based at least in part on the third data;
wherein the first passive infrared sensor is positioned above the second passive infrared sensor, and the first field of view is vertically aligned with the second field of view.

27. The method of claim 26, wherein the first passive infrared sensor, the second passive infrared sensor, and the one or more lenses are positioned such that, when the electronic device is oriented in the first orientation
a left side of the first field of view is aligned with a left side of second field of view, and
a right side of the first field of view is aligned with a right side of the second field of view.

28. The method of claim 26, wherein the first field of view and the second field of view overlap.

29. The method of claim 26, wherein the first field of view and the second field of view do not overlap.

\* \* \* \* \*